United States Patent
Mongelluzzo

(10) Patent No.: US 10,190,319 B1
(45) Date of Patent: Jan. 29, 2019

(54) DEBRIS COLLECTOR FOR ROOF GUTTER SYSTEMS

(71) Applicant: Michael Mongelluzzo, East Quogue, NY (US)

(72) Inventor: Michael Mongelluzzo, East Quogue, NY (US)

( * ) Notice: Subject to any disclaimer, the term of this patent is extended or adjusted under 35 U.S.C. 154(b) by 0 days.

(21) Appl. No.: 15/996,122

(22) Filed: Jun. 1, 2018

Related U.S. Application Data

(63) Continuation-in-part of application No. 15/837,962, filed on Dec. 11, 2017.

(60) Provisional application No. 62/529,908, filed on Jul. 7, 2017.

(51) Int. Cl.
| | |
|---|---|
| *E04D 13/076* | (2006.01) |
| *F21S 4/00* | (2016.01) |
| *F21W 131/107* | (2006.01) |
| *F21Y 115/10* | (2016.01) |
| *F21S 9/03* | (2006.01) |
| *F21Y 103/10* | (2016.01) |

(52) U.S. Cl.
CPC ........... *E04D 13/076* (2013.01); *F21S 4/00* (2013.01); *F21S 9/032* (2013.01); *F21W 2131/107* (2013.01); *F21Y 2103/10* (2016.08); *F21Y 2115/10* (2016.08)

(58) Field of Classification Search
CPC .................................................. E04D 13/076
See application file for complete search history.

(56) References Cited

U.S. PATENT DOCUMENTS

| | | | | |
|---|---|---|---|---|
| 2,841,100 | A * | 7/1958 | Moller | E04D 13/076 210/474 |
| 3,204,090 | A * | 8/1965 | Kvarda, Jr. | F21S 4/20 362/249.01 |
| 3,325,038 | A * | 6/1967 | Ferney | E04D 13/08 220/23.4 |
| 3,420,378 | A * | 1/1969 | Turner | E04D 13/076 210/474 |
| 3,601,835 | A * | 8/1971 | Morgan | E04D 13/0765 15/105 |
| 3,630,383 | A * | 12/1971 | Reeves | B01D 29/01 210/404 |
| 3,834,091 | A * | 9/1974 | Dugan | E04D 13/076 52/12 |
| 3,977,135 | A * | 8/1976 | Hunley, Jr. | E04D 13/076 52/12 |
| 4,032,456 | A * | 6/1977 | Berce | B01D 35/00 210/474 |
| 4,351,134 | A * | 9/1982 | Clarkson | E04D 13/076 210/474 |
| 5,056,276 | A * | 10/1991 | Nielsen | E04D 13/076 210/474 |

(Continued)

*Primary Examiner* — Rodney Mintz
(74) *Attorney, Agent, or Firm* — Feldman Law Group, P.C.; Steven M. Crosby

(57) ABSTRACT

An apparatus for catching debris that includes a collection assembly, the collection assembly including a screen section and a grab rail, the collection assembly capable of moving between a first position and a second position; and a mounting assembly, the mounting assembly including a hinge, the hinge pivotally connecting the mounting assembly to the collection assembly, wherein, when the grab rail is actuated, the collection assembly is moved between the first position and the second position.

10 Claims, 53 Drawing Sheets

(56) References Cited

U.S. PATENT DOCUMENTS

| | | | | |
|---|---|---|---|---|
| 5,586,837 A * | 12/1996 | Udelle | ................ | E04D 13/076 405/118 |
| 5,875,590 A * | 3/1999 | Udelle | ................ | E04D 13/076 405/119 |
| 5,989,357 A * | 11/1999 | Vilhauer, Jr. | ......... | E04D 13/076 134/104.1 |
| 6,019,488 A * | 2/2000 | Hastings | ................ | F21V 15/01 362/152 |
| 6,050,709 A * | 4/2000 | Hastings | .............. | F21V 17/007 362/145 |
| 6,067,755 A * | 5/2000 | Maanum | .............. | E04D 13/076 248/48.1 |
| 6,493,994 B1 * | 12/2002 | Lucas | ................ | E04D 13/076 210/477 |
| 6,955,458 B2 * | 10/2005 | Cheema | .............. | F21V 33/006 362/145 |
| 7,581,356 B1 * | 9/2009 | Balkum | ................ | E04D 13/076 52/11 |
| 7,628,911 B2 * | 12/2009 | Koenig | ................ | E04D 13/076 134/166 R |
| 9,725,909 B2 * | 8/2017 | Ward | ................ | E04D 13/0765 |
| 2003/0070366 A1 * | 4/2003 | Beyers | ................ | E04D 13/076 52/12 |
| 2004/0257801 A1 * | 12/2004 | Cheema | ................ | F21V 33/006 362/152 |
| 2006/0075689 A1 * | 4/2006 | Hawash | ................ | E04D 13/076 52/12 |
| 2007/0234648 A1 * | 10/2007 | Tombazzi | ............. | E04D 13/064 52/12 |
| 2010/0281785 A1 * | 11/2010 | Kaiser | .................... | E04D 13/00 52/24 |
| 2011/0000143 A1 * | 1/2011 | Kaiser | .................... | E04D 13/00 52/24 |
| 2011/0107683 A1 * | 5/2011 | Ringuette | ............ | E04D 13/064 52/12 |
| 2012/0047817 A1 * | 3/2012 | Prentice | ............... | E04D 13/076 52/11 |
| 2013/0055648 A1 * | 3/2013 | Snyder | .................... | E06C 7/486 52/11 |
| 2013/0097943 A1 * | 4/2013 | Higginbotham | ...... | E04D 13/076 52/12 |
| 2017/0058530 A1 * | 3/2017 | Ward | ................ | E04D 13/0765 |

* cited by examiner

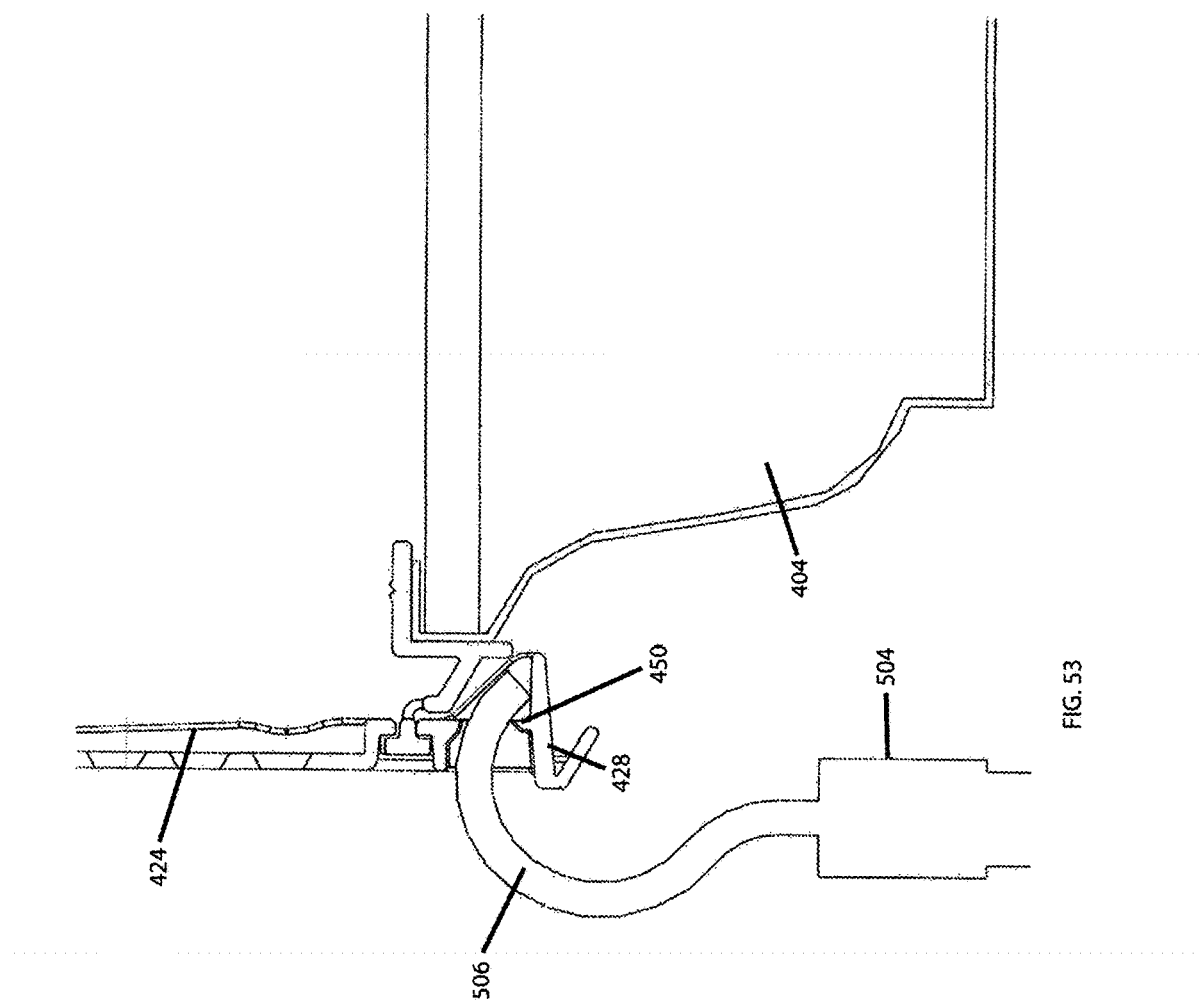

DEBRIS COLLECTOR FOR ROOF GUTTER SYSTEMS

CROSS-REFERENCE TO RELATED APPLICATIONS

This application is a continuation-in-part of co-pending U.S. patent application Ser. No. 15/837,962, filed Dec. 11, 2017, and claims the benefit of U.S. provisional patent application Ser. No. 62/529,908, filed on Jul. 7, 2017, which patent applications are incorporated here by reference in their entirety to provide continuity of disclosure.

BACKGROUND

In a downpour, a clogged roof gutter can send a cascade of water down the side of a house, making canyons of flowerbeds and saturating a home's foundation. Clean gutters protect your siding and landscape plantings and prevent thousands of dollars of damage to a home's foundation. Therefore, it is in a homeowner's best interest to clean gutters of leaves and debris to help prevent damage and to head off expensive water damage repairs to a home.

Gutters should be cleaned at least once a year—twice a year if you have overhanging trees and more often if big storms are regular occurrence in the area of the home. The typical way to clean gutters is time-consuming and potentially dangerous as it entails donning proper cloths and gloves, climbing a ladder with a small plastic scoop in hand and clearing and removing leaves and debris. Afterwards, the gutters and downspouts should be flushed with a garden hose. If climbing ladders is not a task a homeowner can handle, a professional can be hired to do the job at a large expense.

A homeowner can slow clogging by installing gutter covers in the form of mesh screens, clip-on grates, or porous foam. However, these gutter covers also need maintenance, which is also time-consuming and potentially dangerous, at regular intervals to keep them clear.

SUMMARY

The disclosed technology is a debris collector for roof gutters that allows debris to collect and, using a poling tool and a hose from a ground level, the debris collector can be inverted, emptied and cleaned. This saves time, money and avoids the use of a ladder.

In one implementation, an apparatus for catching debris can comprise: a collection assembly, the collection assembly including a screen section and a grab rail, the collection assembly capable of moving between a first position and a second position; and a mounting assembly, the mounting assembly including a hinge, the hinge pivotally connecting the mounting assembly to the collection assembly, wherein, when the grab rail is actuated, the collection assembly is moved between the first position and the second position. In some implementations, the mounting assembly can be fixedly attached to a gutter.

In some implementations, the hinge can include a tee section and a hinge section. In some implementations, the hinge section can be made from a flexible material. In some implementations, the tee section and the mounting assembly can be formed from a solid material. In some implementations, the tee section, the hinge section and the mounting assembly are formed as a single unit during a co-extrusion process.

In some implementations, the collection assembly can include a tee receiver guide for slidably receiving the hinge. In some implementations, the tee receiver guide can include fingers.

In some implementations, the collection assembly can include reinforcing strips. In some implementations, the reinforcing strips can include indents providing spacing for screw position ribs. In some implementations, the screen section can be laid out in a grid pattern. In some implementations, the grab rail can include a catch.

BRIEF DESCRIPTION OF THE DRAWINGS

FIG. 53 is an exploded view of the debris collector and the poling tool shown in FIG. 52.

DETAILED DESCRIPTION OF THE INVENTION

The disclosed technology relates to a debris collector for a roof gutter system. Specifically, the debris collector is designed so that debris that normally collects in a gutter system can be trapped within the debris collector. Once debris has collected, the debris collector can be moved from a first position to a second position for removal of the debris from the debris collector, as will be described more fully below.

Figure 6:
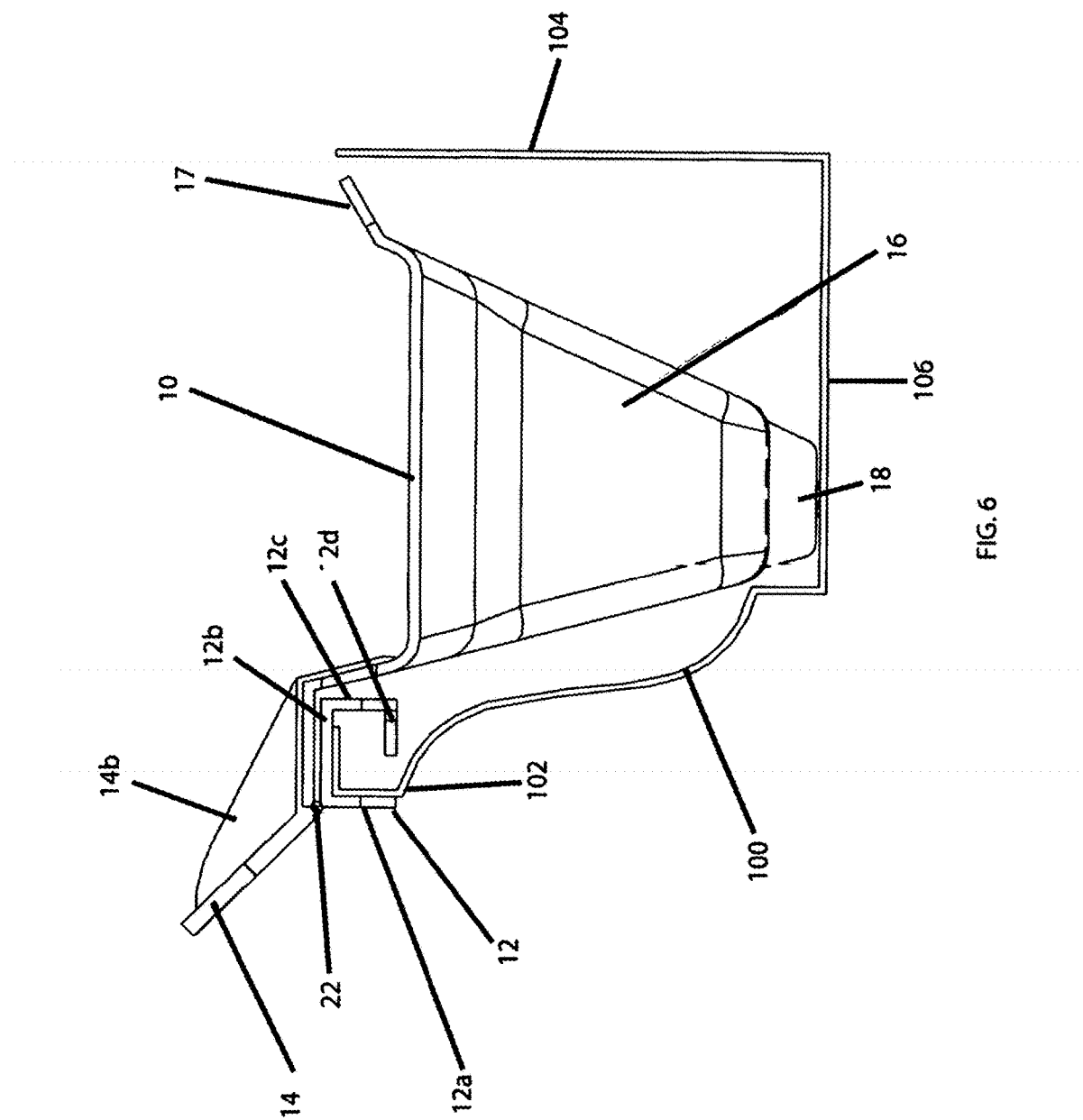
FIG. 6 is a side view of a debris collector of the disclosed technology secured within a roof gutter in a first position.
Figure 7:
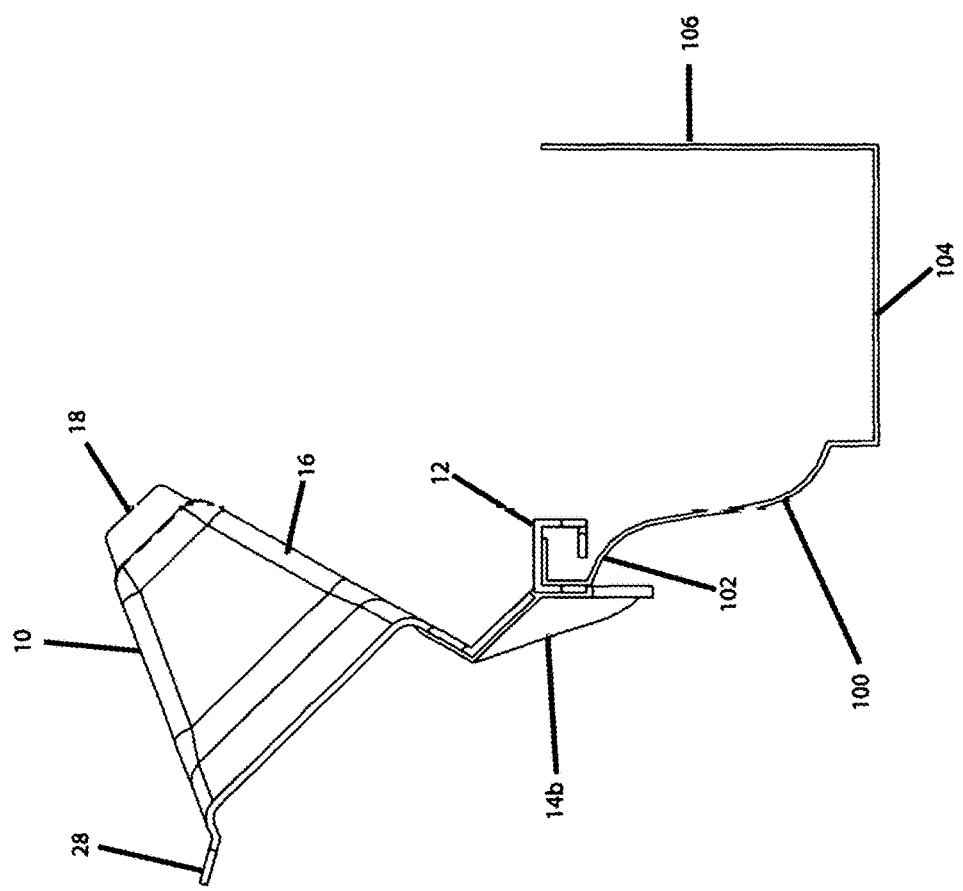
FIG. 7 is a side view of a debris collector of the disclosed technology secured within a roof gutter in a second position.

As shown in FIGS. 1-4, the debris collector 10 can include a clip assembly 12 and a basket section 16. The clip assembly 12 and the basket section 16 can be movably connected to each other with a hinge 22. The hinge 22 allows the debris collector 10 to move from a first position to a second position, as shown in FIGS. 6 and 7. The first position allows debris to collect within the debris collector 10 and the second position allows for removal of the debris from the debris collector 10.

The basket section 16 of the debris collector 10 can include strainer openings 20 that allow water to flow through the debris collector 10 but retain any debris that collects within the basket section 16. The basket section 16 of the debris collector 10 can also include risers 18. The risers 18 allow the basket section 16 to sit slightly above the bottom 106 of a roof gutter system 100 as shown in FIG. 6. The height of the riser 18 can be chosen so that rain water can freely flow though the strainer openings 20 of the basket section 16 while allowing the rain water to freely flow through the roof gutter system 100.

Figure 5:
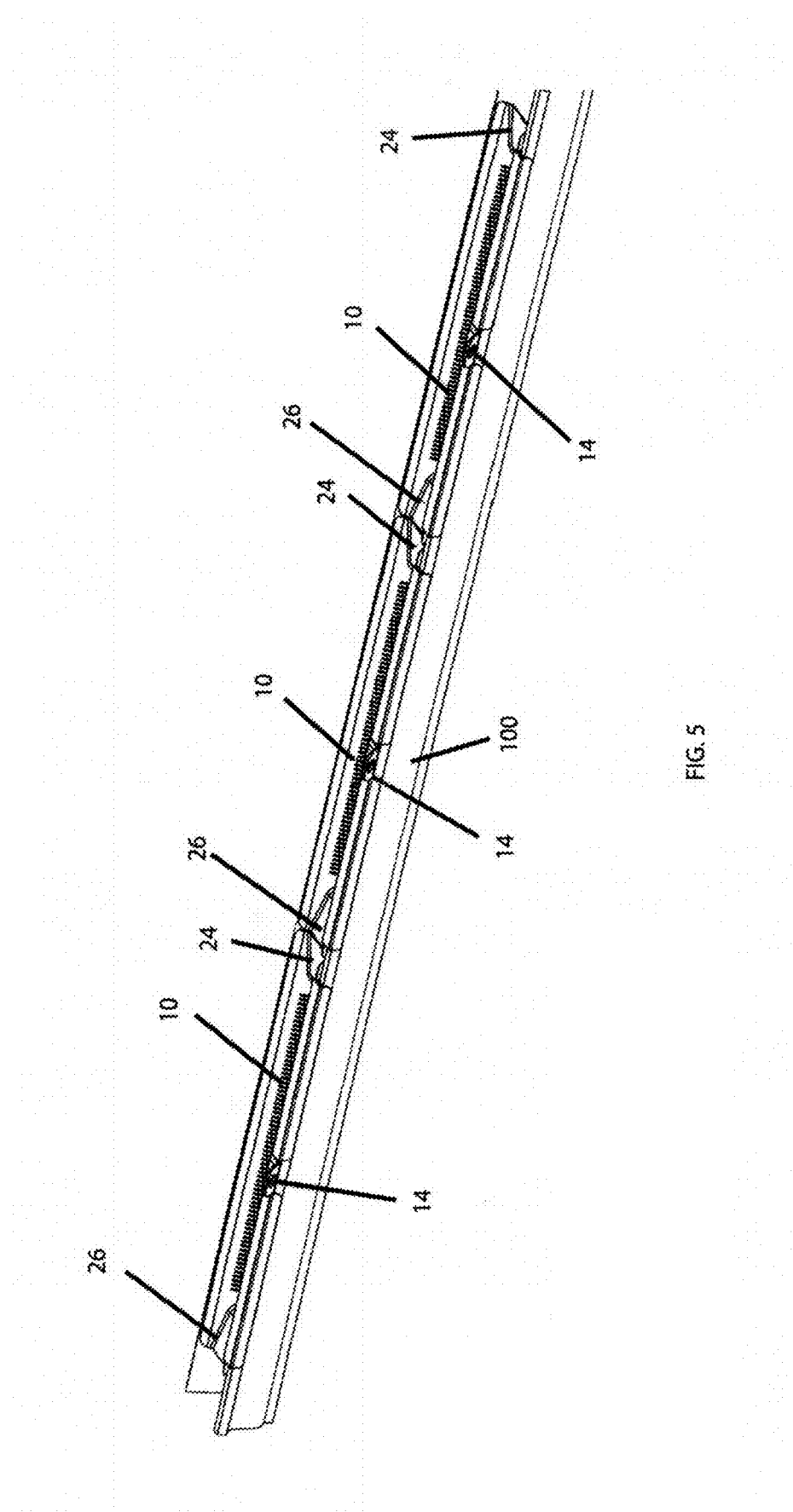
FIG. 5 is a perspective view of a debris collector of the disclosed technology secured within a roof gutter in a first position.

The basket section 16 of the debris collector 10 can also include a right extension 24, a left extension 26 and a rear extension 17. The right extension 24 and the left extension 26 can be used for placement of the several debris collectors adjacent to one another within a gutter system, as shown in FIG. 5. The right extension 24 and the left extension 26 can also be sloped so that rain water can be directed into the basket section 16. The rear extension 17 can be used for placement of the debris collector 10 in close proximity to a rear side 104 of the roof gutter system 100.

Figure 11:
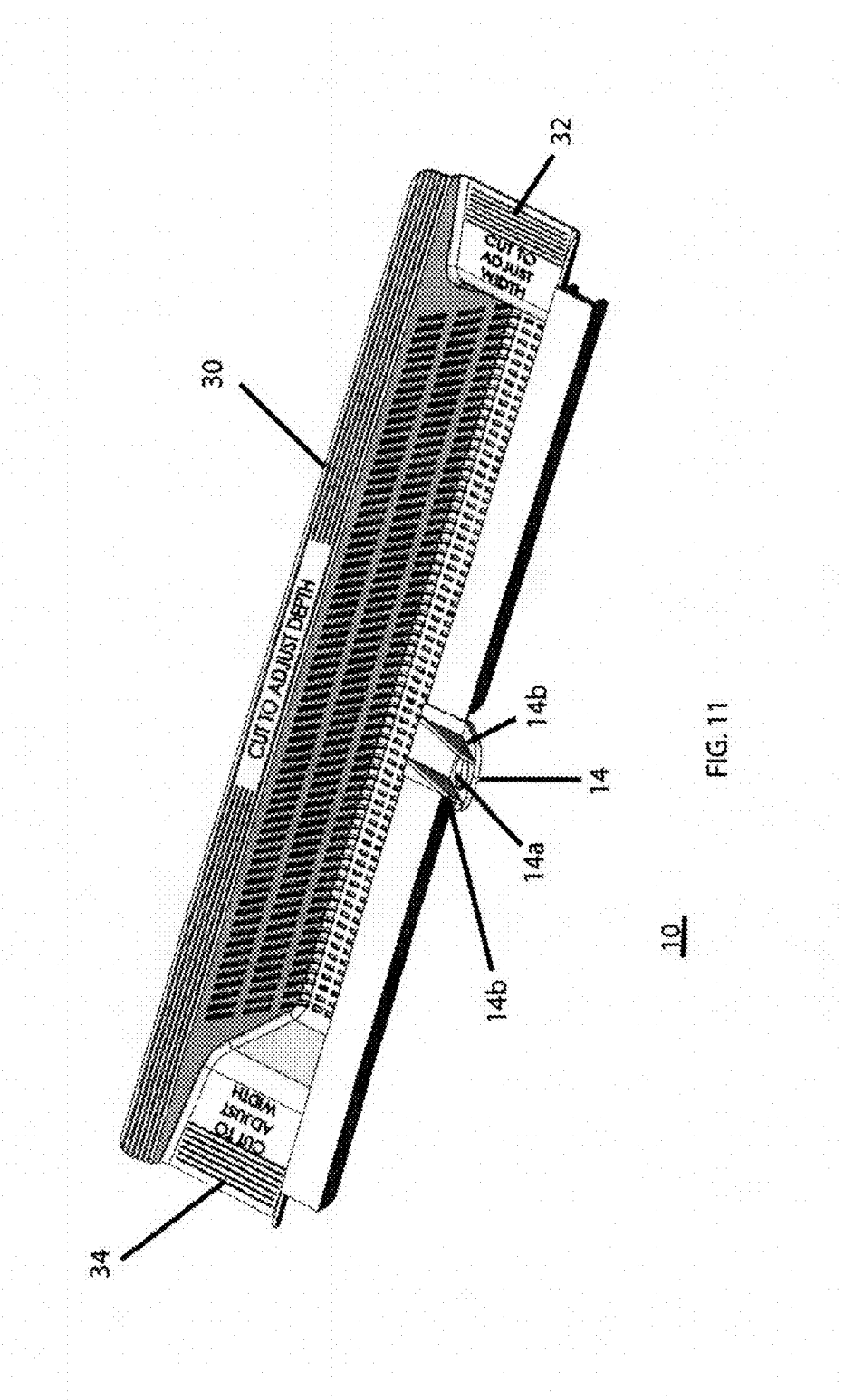
FIG. 11 is a top perspective view of a debris collector of the disclosed technology.

As shown in FIG. 11, the right extension 24, the left extension 26 and the rear extension 17 can include score lines 30, 32, 34 for customizing and sizing the right extension 24, the left extension 26 and the rear extension 17 to fit within existing gutter systems.

The debris collector 10 can also include a lever 14. The lever 14 can be positioned midpoint on the debris collector 10, but other configurations are contemplated. The lever 14, when actuated, allows the debris collector to be moved from the first position to a second position. The lever 14 can include an opening 14a for receiving a tool (not shown) which can allow a user to rotate the debris collector 10 from the first position to a second position via the hinge 22. In some implementations, the lever 14 can also include a strengthening rib 14b for adding strength to the lever 14.

Figure 1:
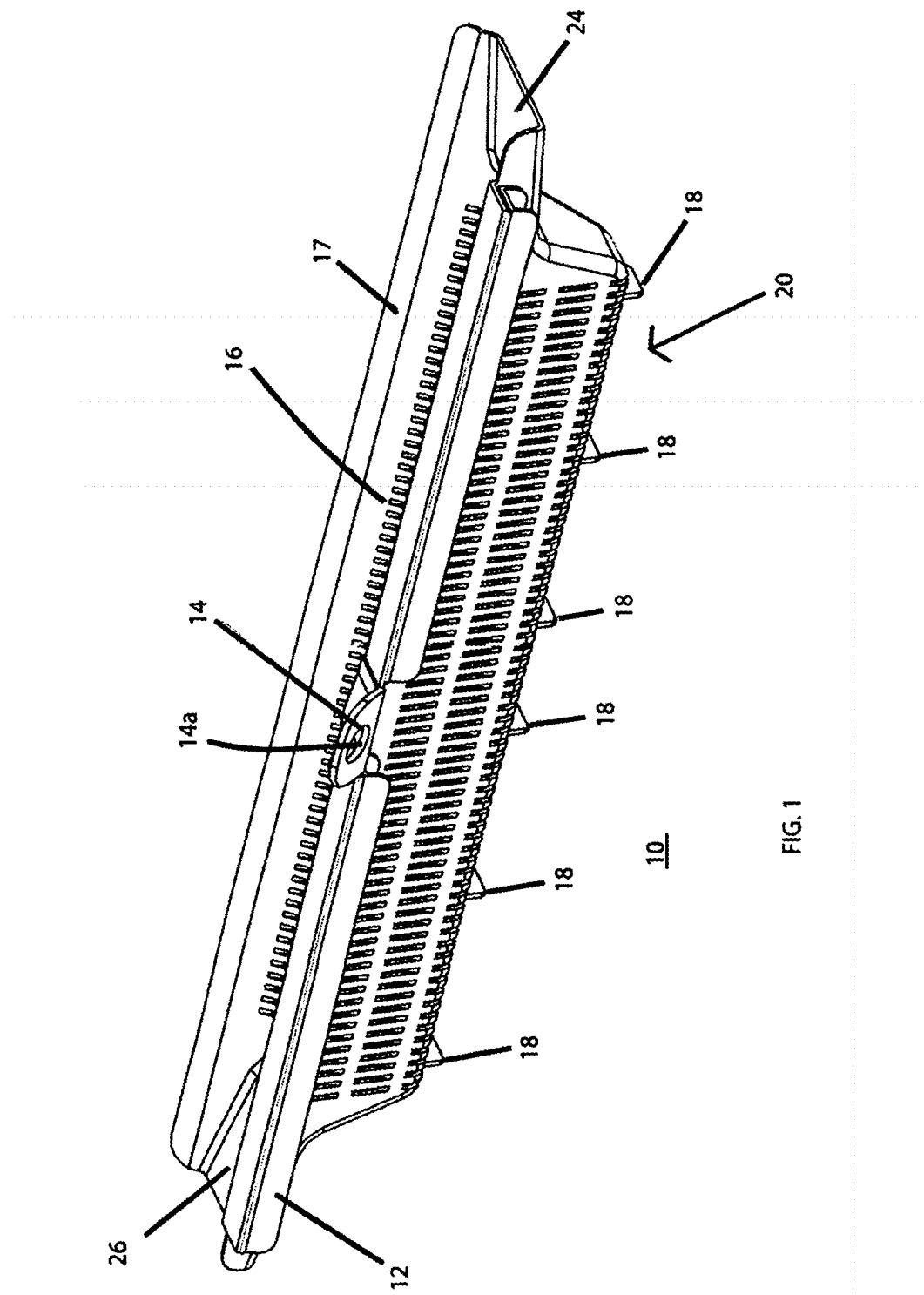
FIG. 1 is a top perspective view of a debris collector of the disclosed technology.
Figure 2:
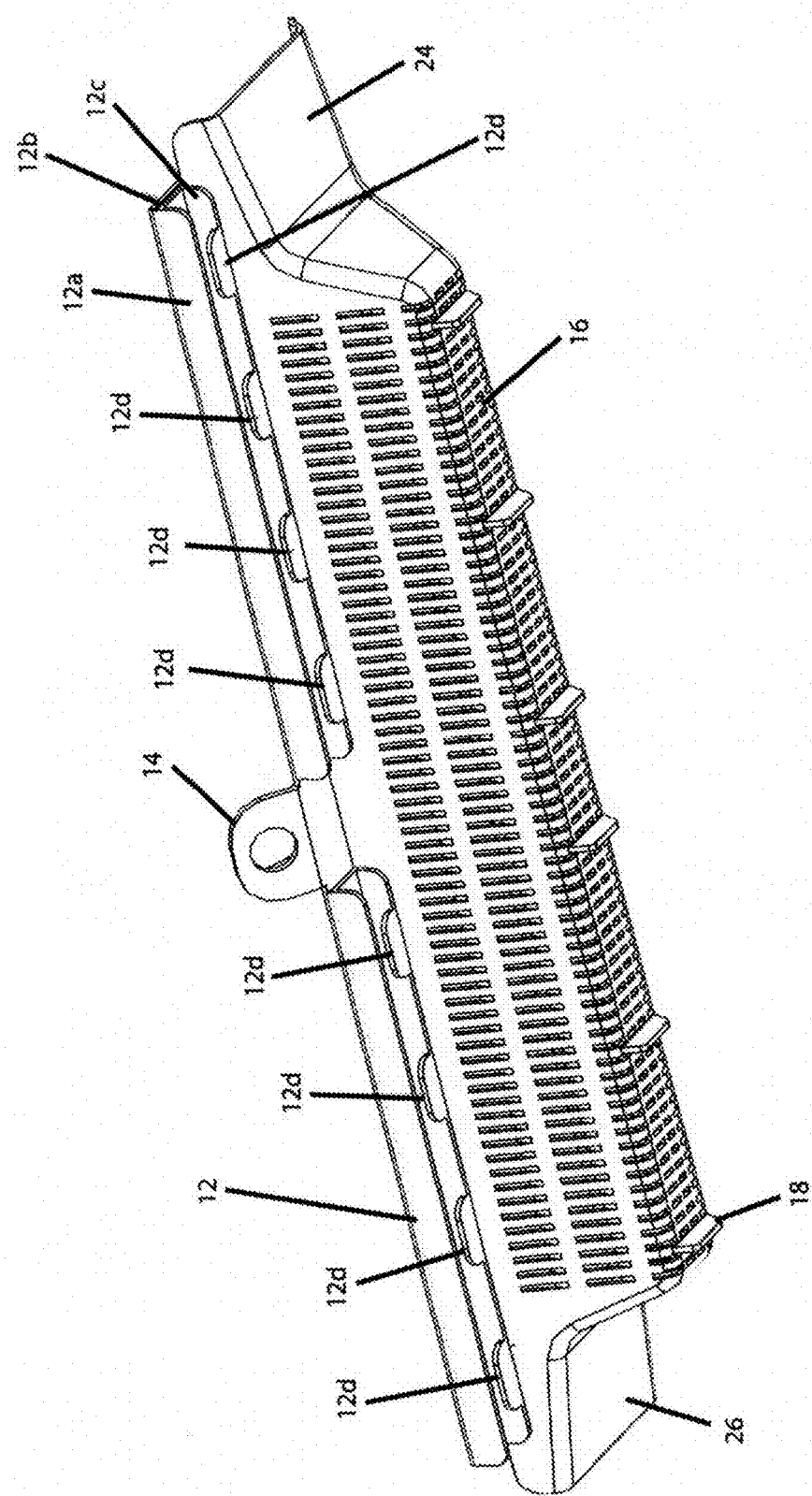
FIG. 2 is a bottom perspective view of a debris collector of the disclosed technology.
Figure 3:
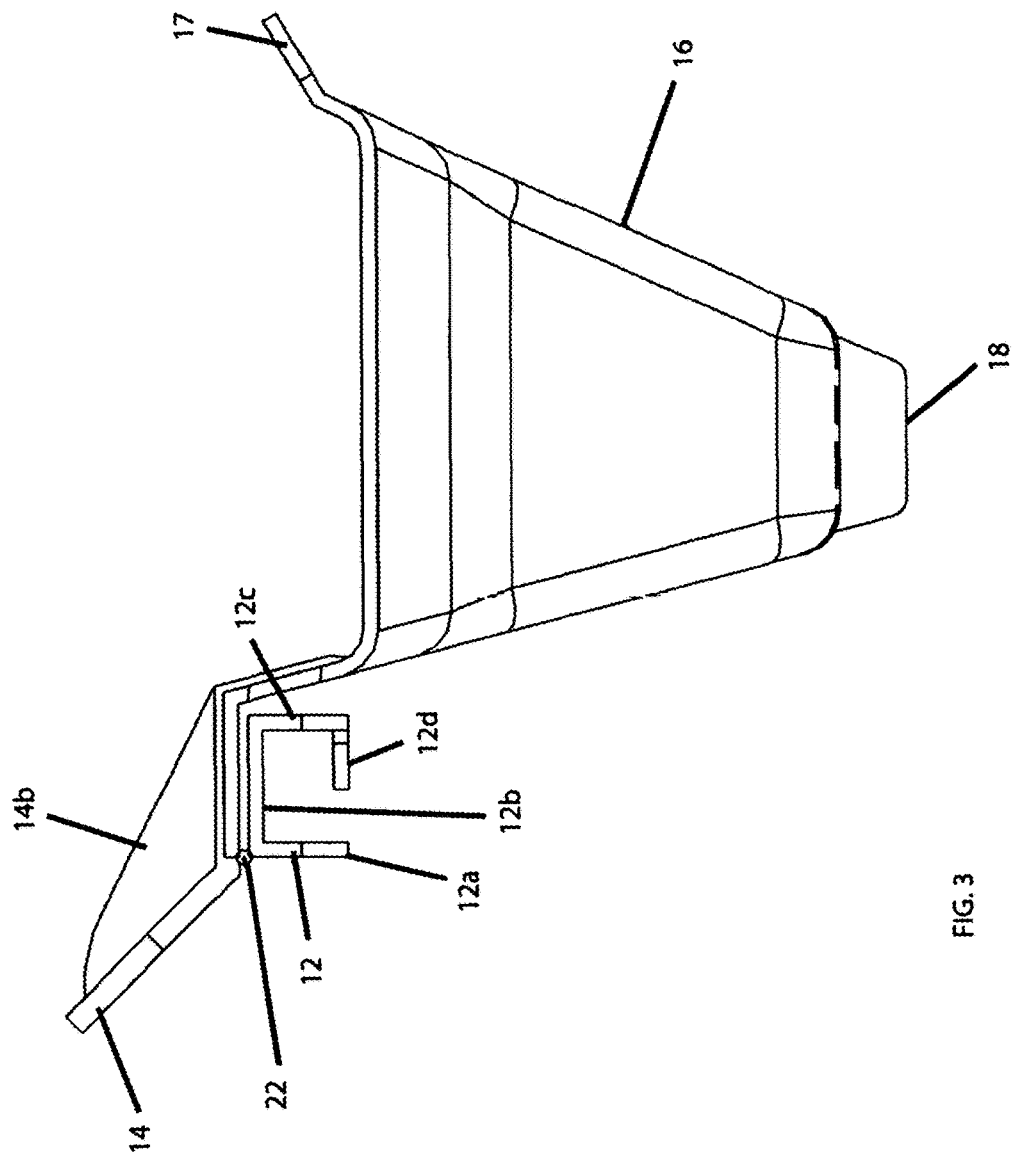
FIG. 3 is a side view of a debris collector of the disclosed technology.
Figure 4:
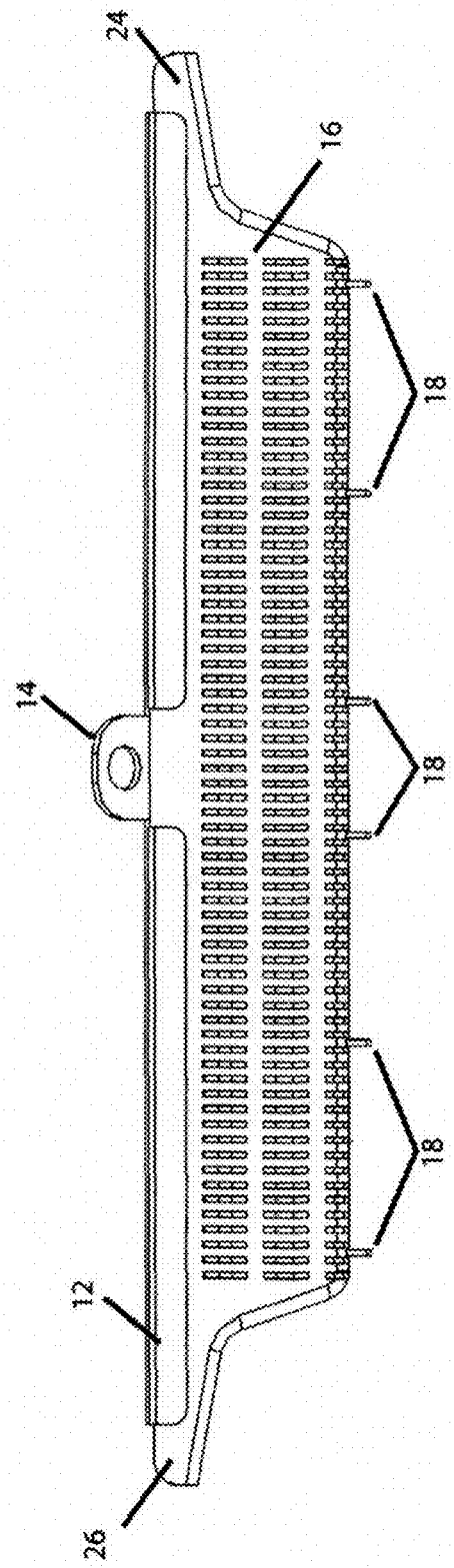
FIG. 4 is a front view of a debris collector of the disclosed technology.

As shown in FIG. 2, the clip assembly 12 can include a front lip 12a, a top lip 12b, a rear lip 12c and hooking tabs 12d. The clip assembly 12 can securely retain the debris collector 10 to the roof gutter system 100. That is, as shown in FIG. 6, the clip assembly 12 can be snap-fitted to a gutter flange 102, but other attachment mechanisms are contemplated. In this configuration, the gutter flange 102 can be firmly seated within the clip assembly 12. This configuration also allows the debris collector 10 to be removable from the gutter system 100.

Figure 8:
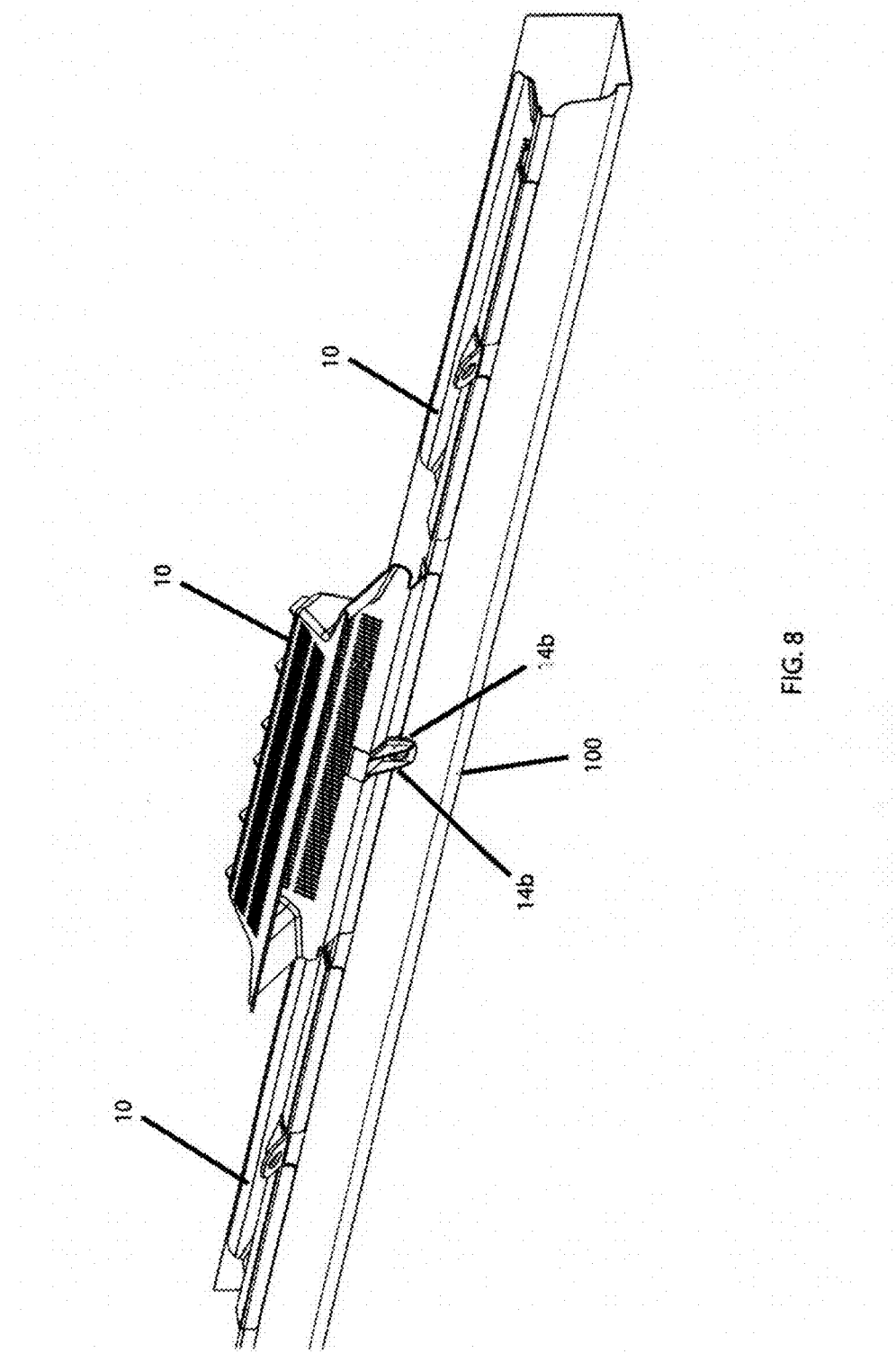
FIG. 8 is a perspective view of a debris collector of the disclosed technology secured within a roof gutter in a second position.
Figure 9:
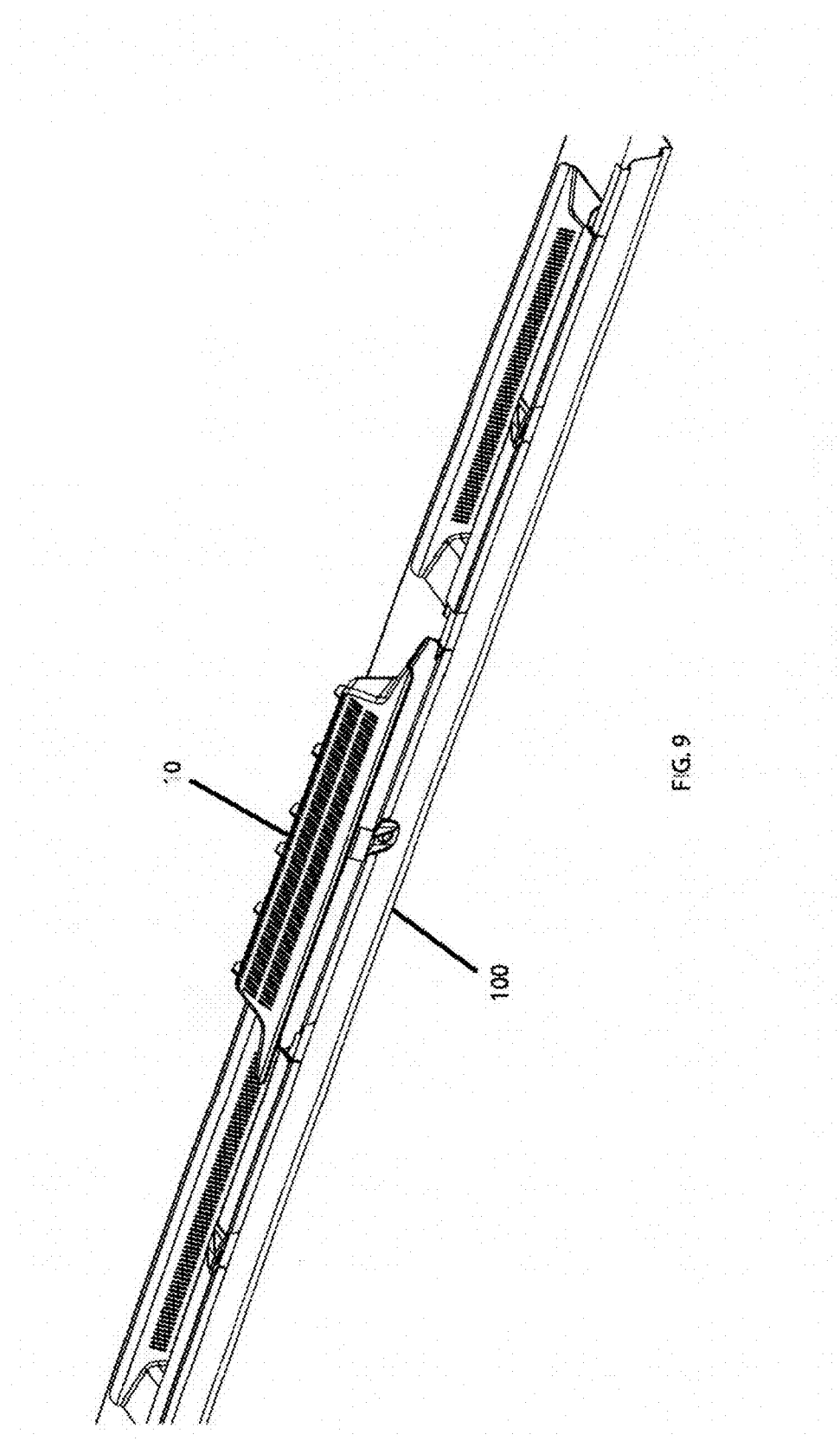
FIG. 9 is a perspective view of a debris collector of the disclosed technology secured within a roof gutter in a second position.
Figure 10:
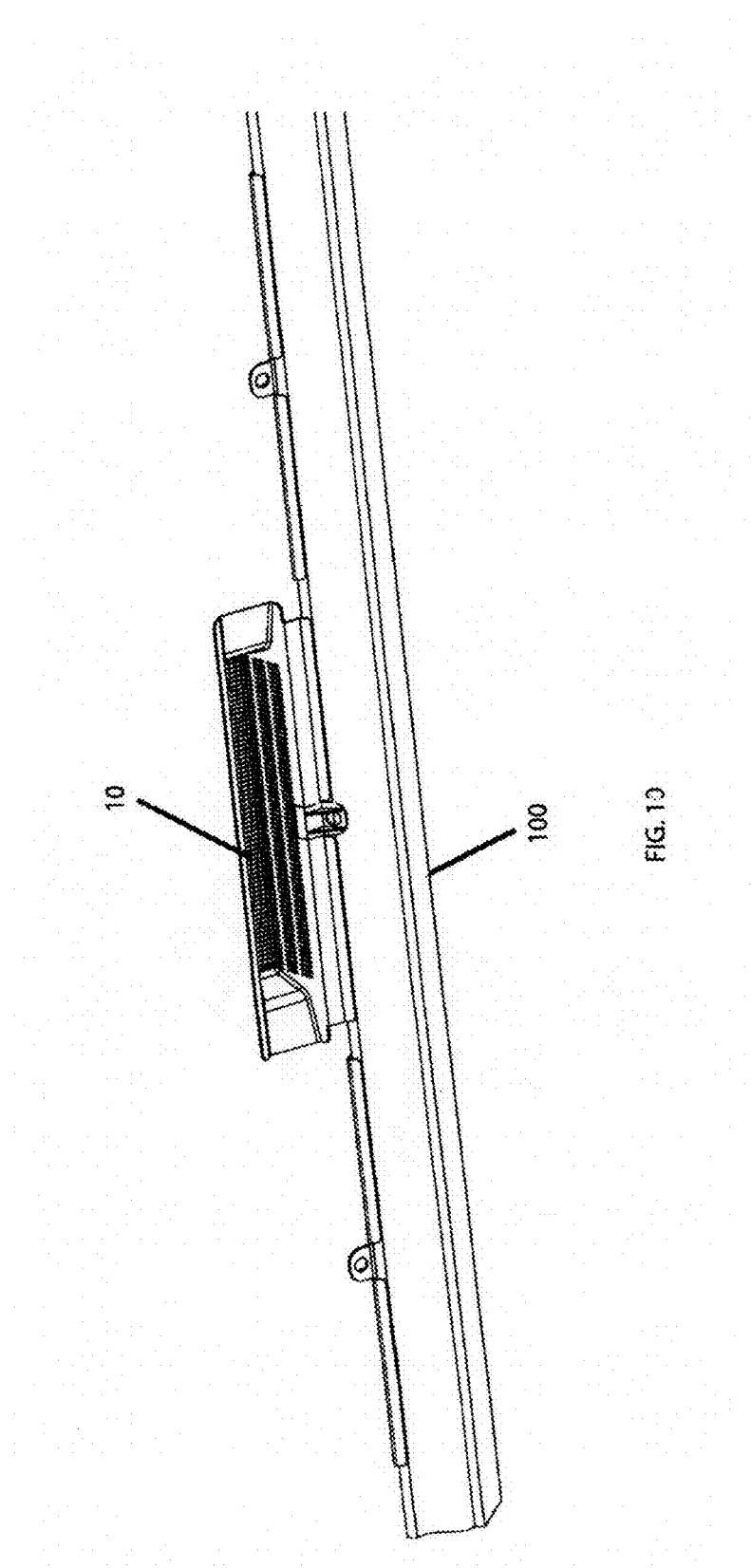
FIG. 10 is a perspective view of a debris collector of the disclosed technology secured within a roof gutter in a second position.

As shown in FIGS. 8-10, the debris collector 10 can be rotated out of the roof gutter system 100 for removing the debris from the debris collector. In some implementations, a user can place a hooked or magnetic tip of a poling tool (shown in FIGS. 29-36) into the opening 14a of the lever 14. Once inserted or magnetically connected, the user can apply downward pressure to the poling tool so that the lever 14 is moved downwards which in turn causes the basket section 16 to be rotated out of the gutter system 100. Once the debris collector 10 is placed in an inverted second position most if not all of the debris will fall out of the gutter and down to the ground. If some debris remains within the debris collector 10, a stream of a garden hose can be directed into the basket section 16 for clearing any remaining debris. After the basket section 16 is cleaned out, the user can push the lever in an upwards direction with the poling tool. This motion causes the basket section 16 to rotate and allows the basket section 16 to return to its seated position within the gutter system 100.

In some implementations, as shown in FIGS. 12-17, a debris collector 110 can include a collection assembly 111 and a mounting assembly 113. The collection assembly 111 and the mounting assembly 113 can be movably connected to each other with a hinge 120. The hinge 120 allows the debris collector 110 to move from a first position, shown in FIGS. 12-14, to a second position, shown in FIGS. 15-17. The first position allows debris to collect within the collection assembly 111 and the second position allows for removal of the debris from collection assembly 111.

The hinge 120 can be constructed from a flexible material and can be fixedly connected to the mounting assembly 113 or can be integrally formed with the mounting assembly 113 at one end. The hinge 120 can also include securing tab 136 at the other end. The securing tab 136 is capable of receiving a front edge 144b of the collection assembly 111. The front edge 144b can be seated and secured within the securing tab 136. In some implementations, the front edge 144b can have a downward slant.

Figure 12:
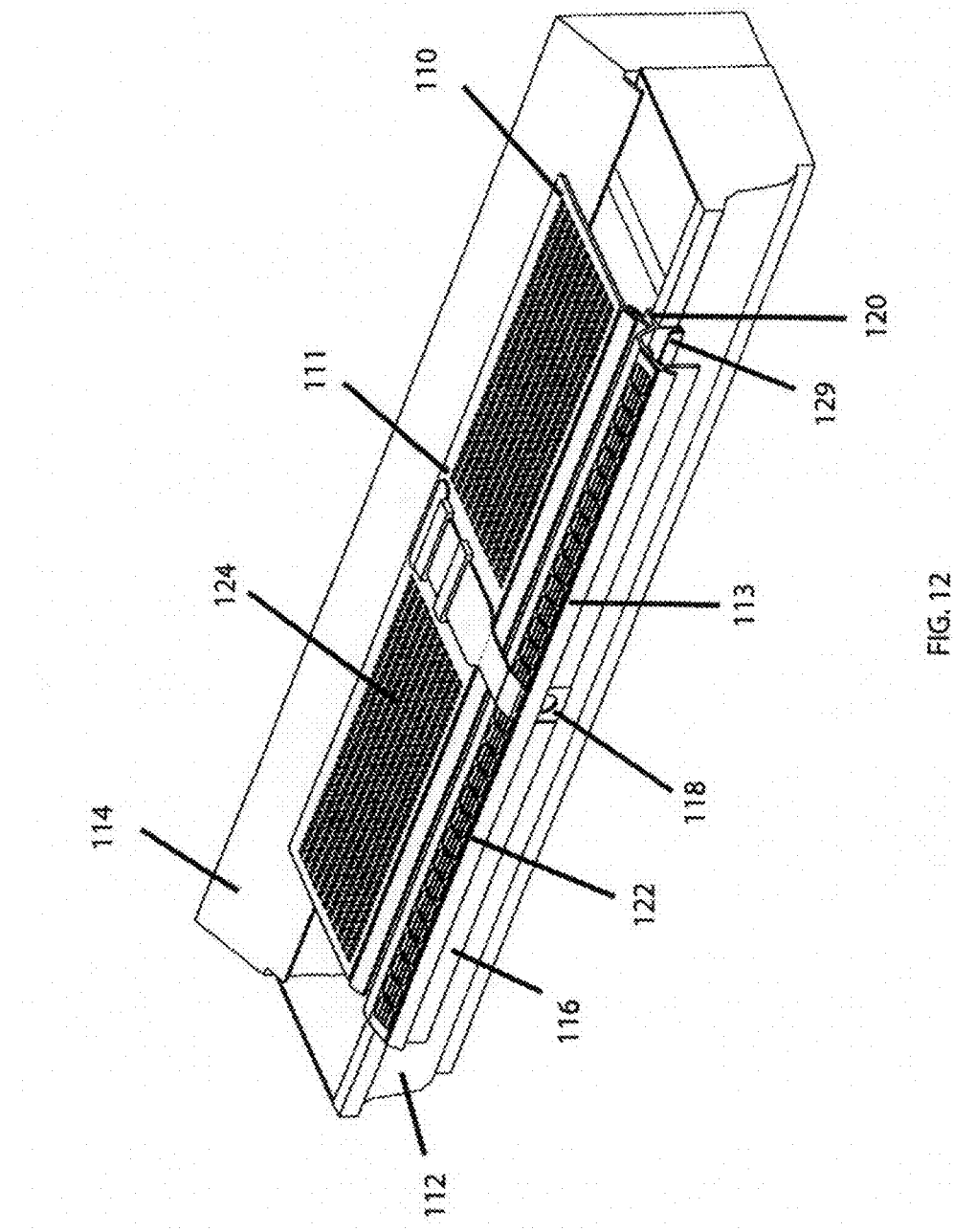
FIG. 12 is a perspective view of a debris collector of the disclosed technology in a first position.
Figure 13:
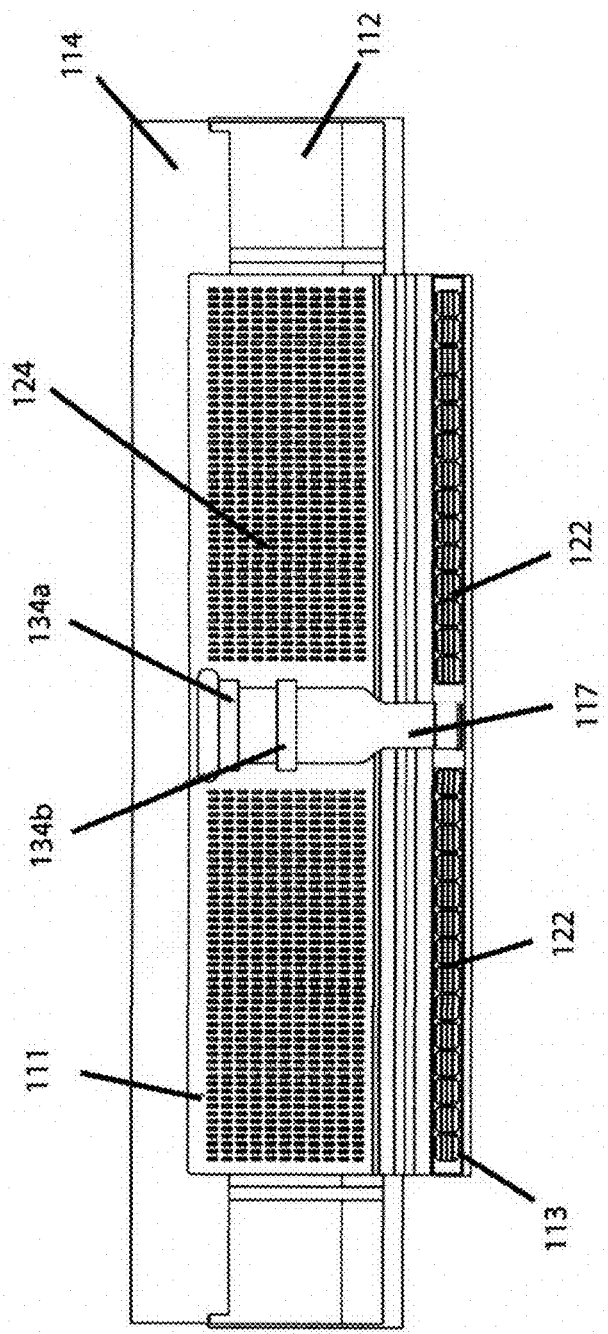
FIG. 13 is a top view of a debris collector of the disclosed technology in a first position.

The collection assembly 111 of the debris collector 110 can also include screen 124, e.g. a substantially flat and rectangular-shaped screen, that allows water to flow onto and through the screen 124 of the debris collector 110 but retains any debris that collects on a top surface of the screen 124. The screen 124 of the debris collector 110 can include a back edge 144a that rests on a roof shingle 114 as shown in FIG. 12. The back edge 144a is capable of allowing water to flow from a roof surface over the screen 124.

The debris collector 110 can also include a lever 117. The lever 117 can be positioned midpoint on the debris collector 110, but other configurations are contemplated. The lever 117, when actuated, allows the debris collector 110 to be moved from the first position to a second position. The lever 117 can include a pull tab 118 for receiving a tool (not shown) which can allow a user to rotate the debris collector 110 from the first position to a second position via the hinge 120. In some implementations, the lever 117 can be attached to the screen 124 by holders 134a, 134b.

Figure 17:
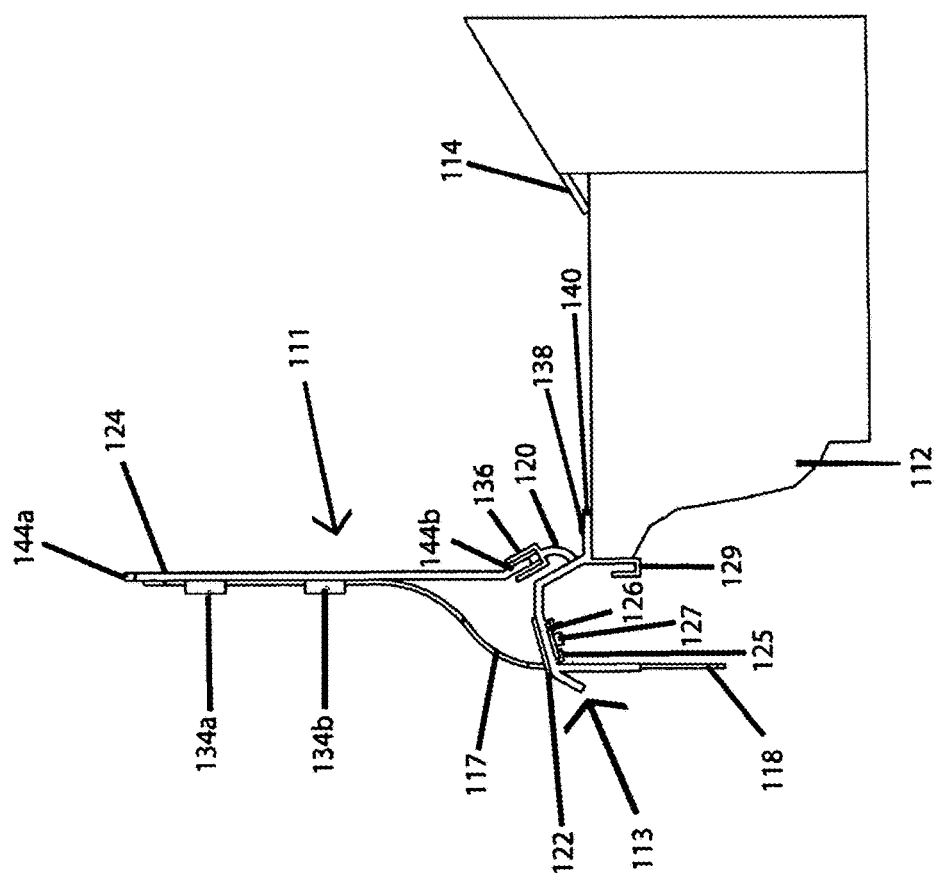
FIG. 17 is a cross-sectional view of a debris collector of the disclosed technology in a second position.
Figure 18:
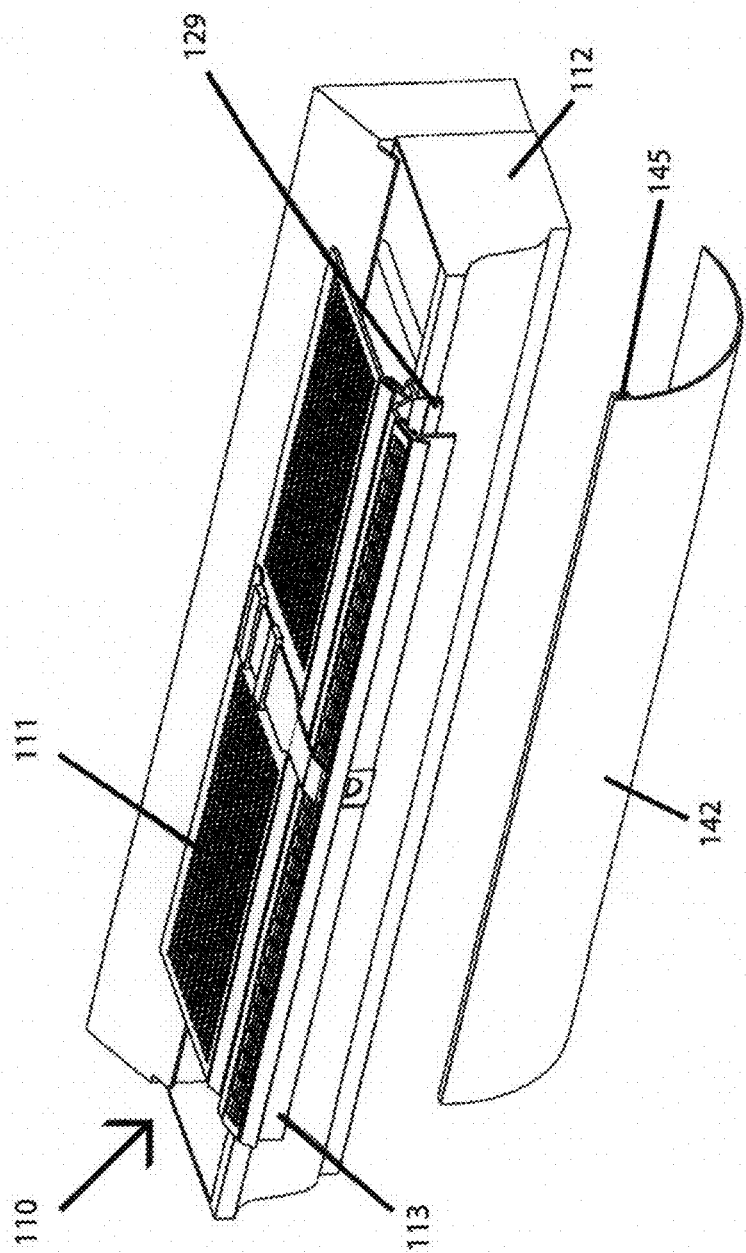
FIG. 18 is a perspective view of a debris collector of the disclosed technology with an unattached decorative cover.

The mounting assembly 113 can include an extrusion section 116 and an attachment ledge 140. The mounting assembly 113 can securely retain the debris collector 110 to the roof gutter system 112. That is, as shown in FIG. 17, the attachment ledge 140 can be fixedly attached roof gutter system 112, e.g., the attachment ledge 140 can be fixedly attached a gutter flange of the roof gutter system 112 with screws 138, but other attachment mechanisms are contemplated.

In some implementations, the extrusion section 116 can include a solar panel 122, an LED lighting strip 126, a drip edge 130, a light shield 132, strip guides 125 and hooking rail 129.

The solar panel 122 can be attached to a top surface of the extrusion section 116 with, e.g., an adhesive or clips, and the LED lighting strip 126 can be attached to an underside of the top surface of the extrusion section 116, e.g. with strip guides 125, but other attachment mechanisms are contemplated. The solar panel and the LED lighting strip 126 can be electrically connected to one another so that the solar panel can power the LEDs 127 of the LED lighting strip 126.

Figure 14:
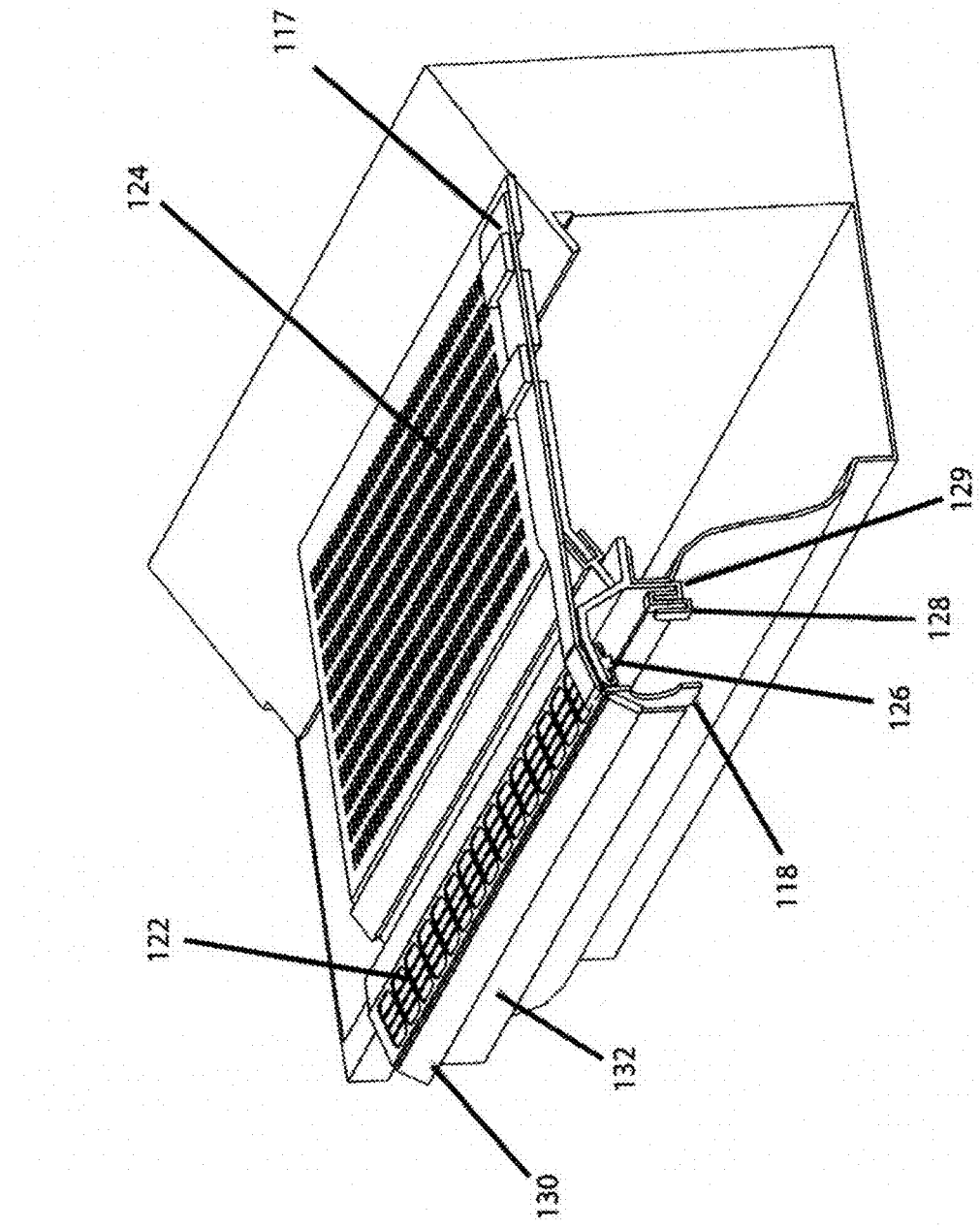
FIG. 14 is a perspective, cross-sectional view of a debris collector of the disclosed technology in a first position.
Figure 15:
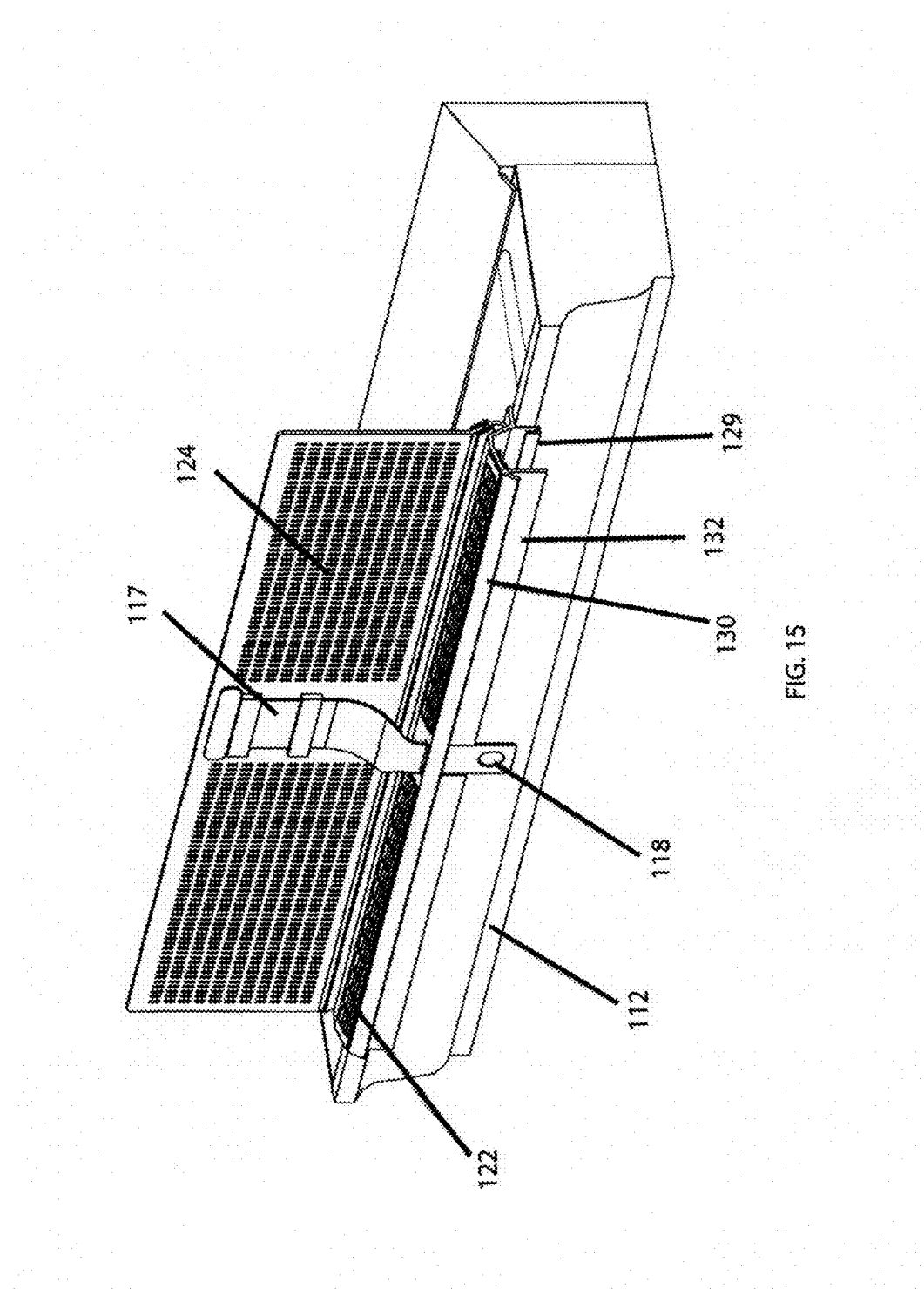
FIG. 15 is a perspective view of a debris collector of the disclosed technology in a second position.
Figure 16:
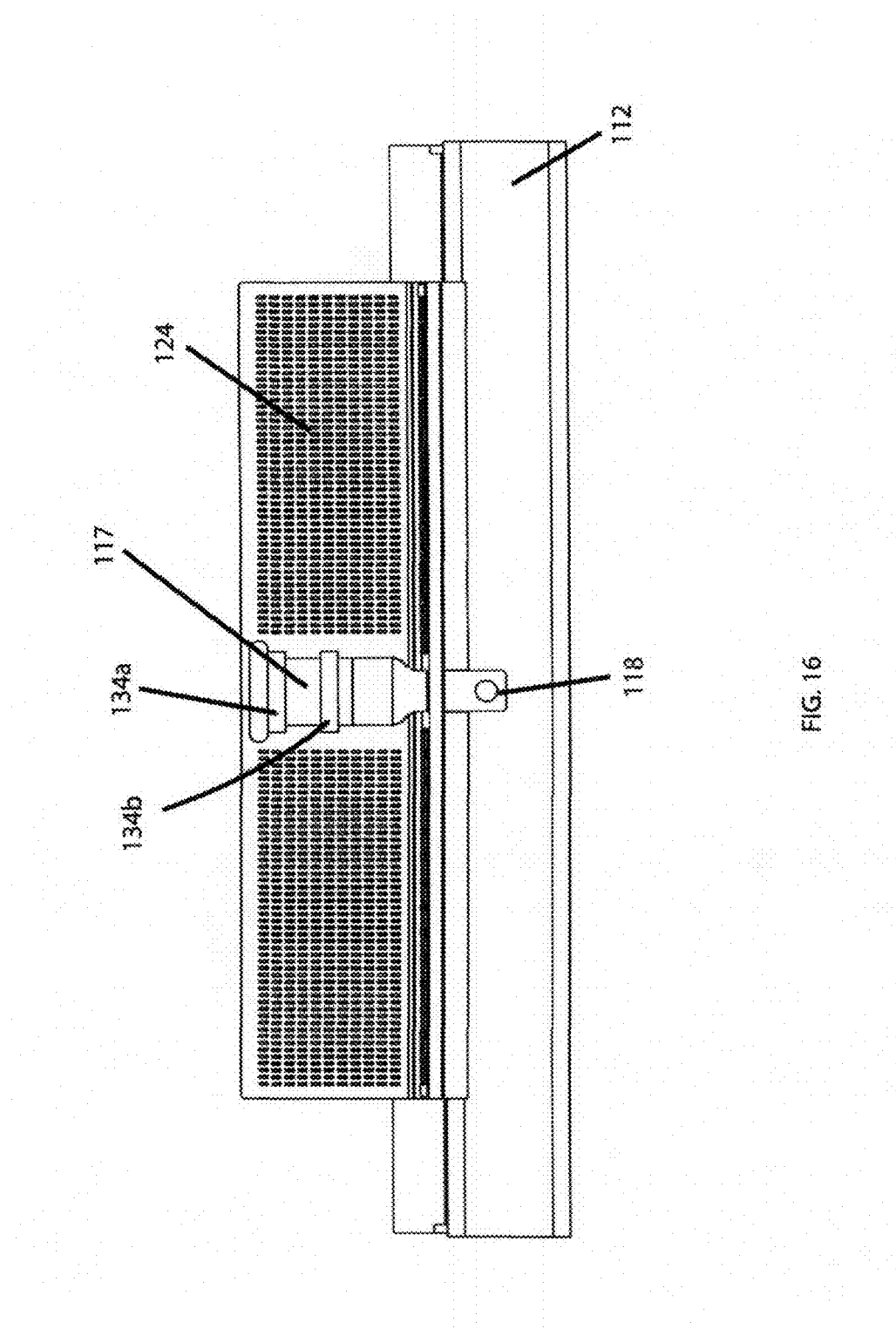
FIG. 16 is a front view of a debris collector of the disclosed technology in a second position.
Figure 19:
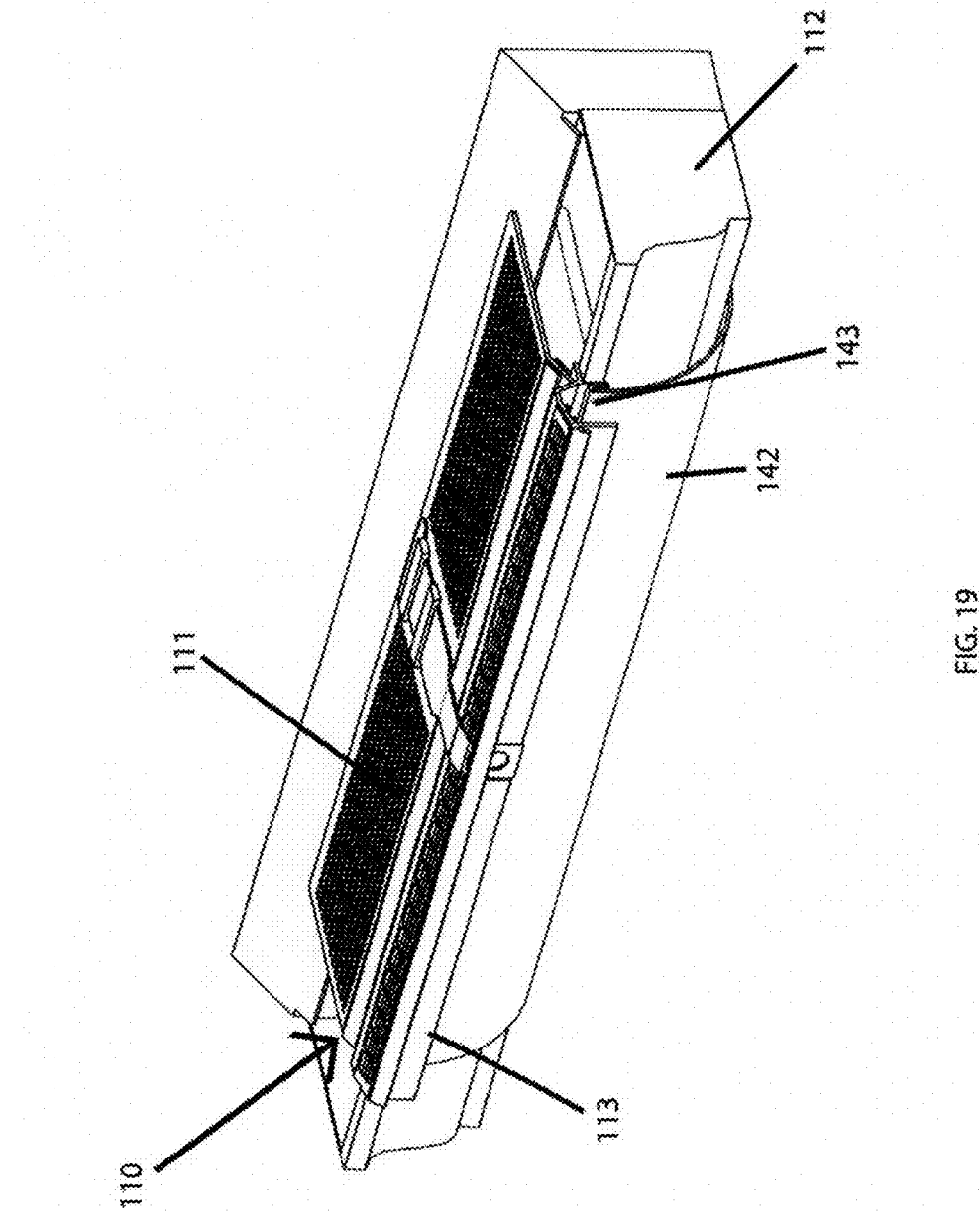
FIG. 19 is a perspective view of a debris collector of the disclosed technology with an attached decorative cover.
Figure 20:
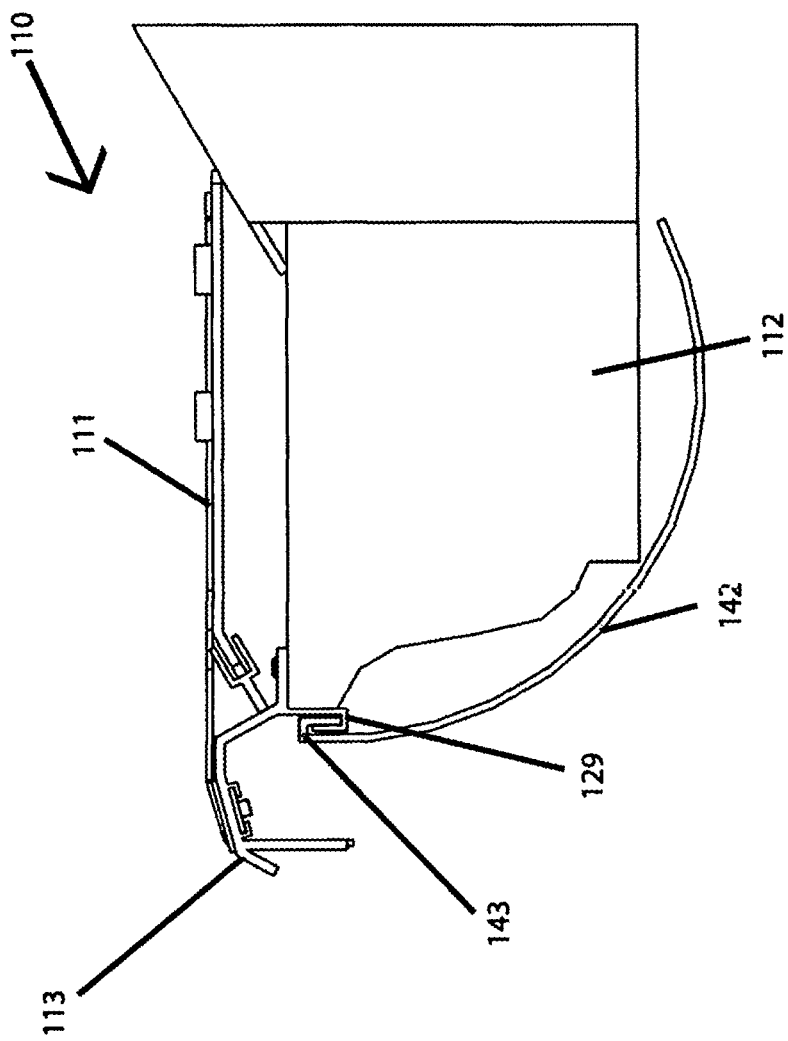
FIG. 20 is a cross-sectional view of a debris collector of the disclosed technology with an attached decorative cover.
Figure 21:
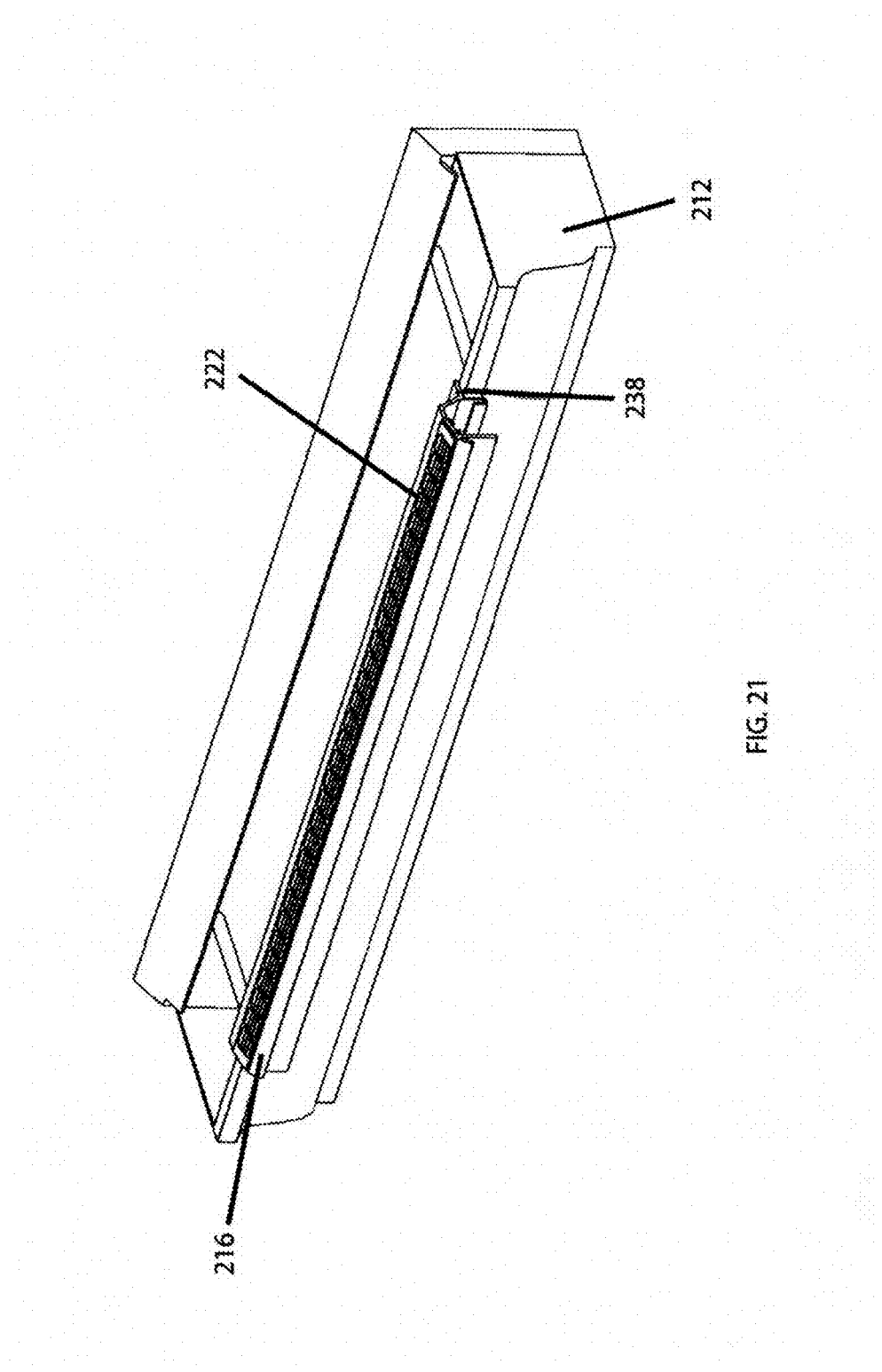
FIG. 21 is a perspective view of an extrusion assembly of the disclosed technology.
Figure 22:
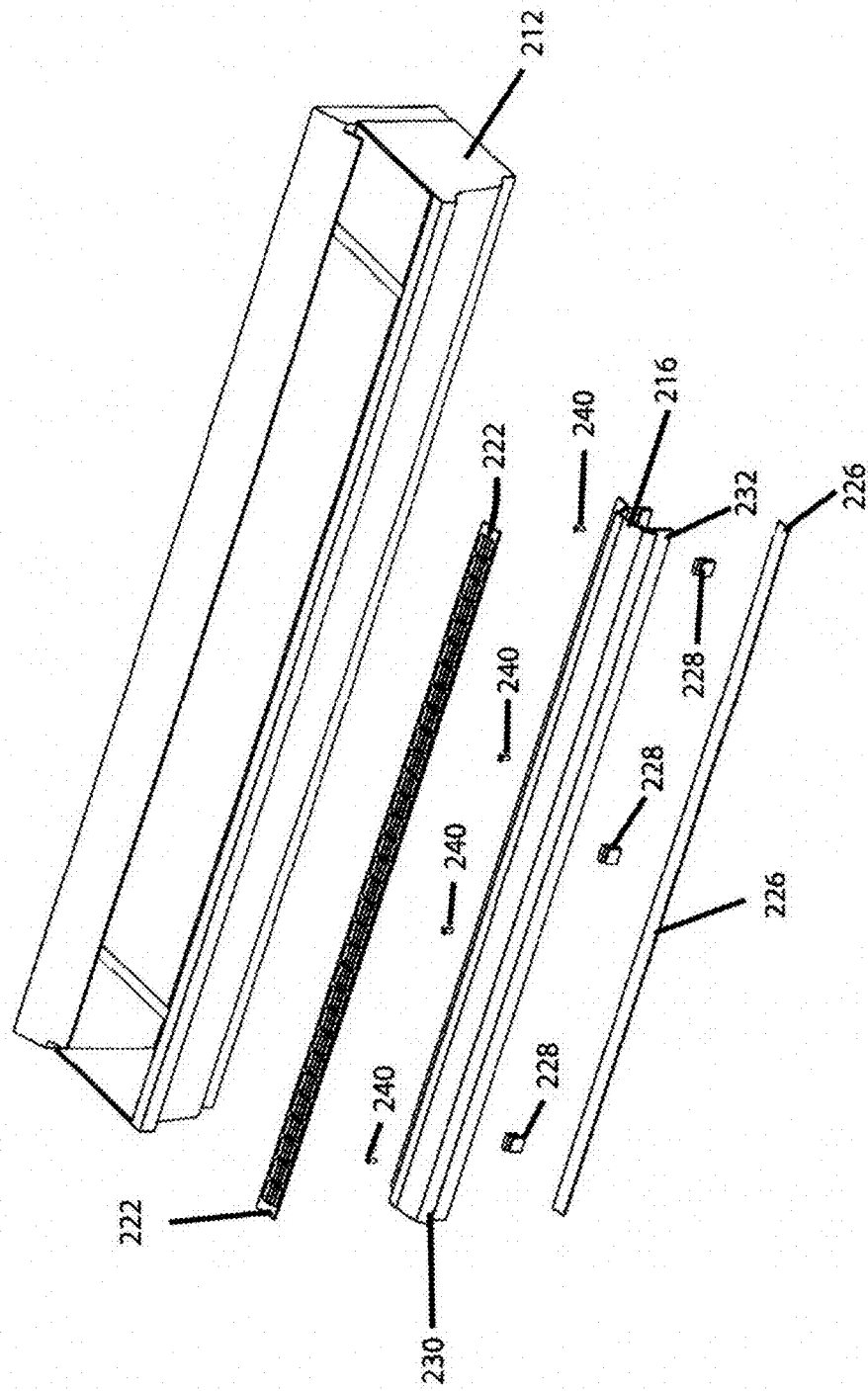
FIG. 22 is an exploded view of an extrusion assembly of the disclosed technology.
Figure 23:
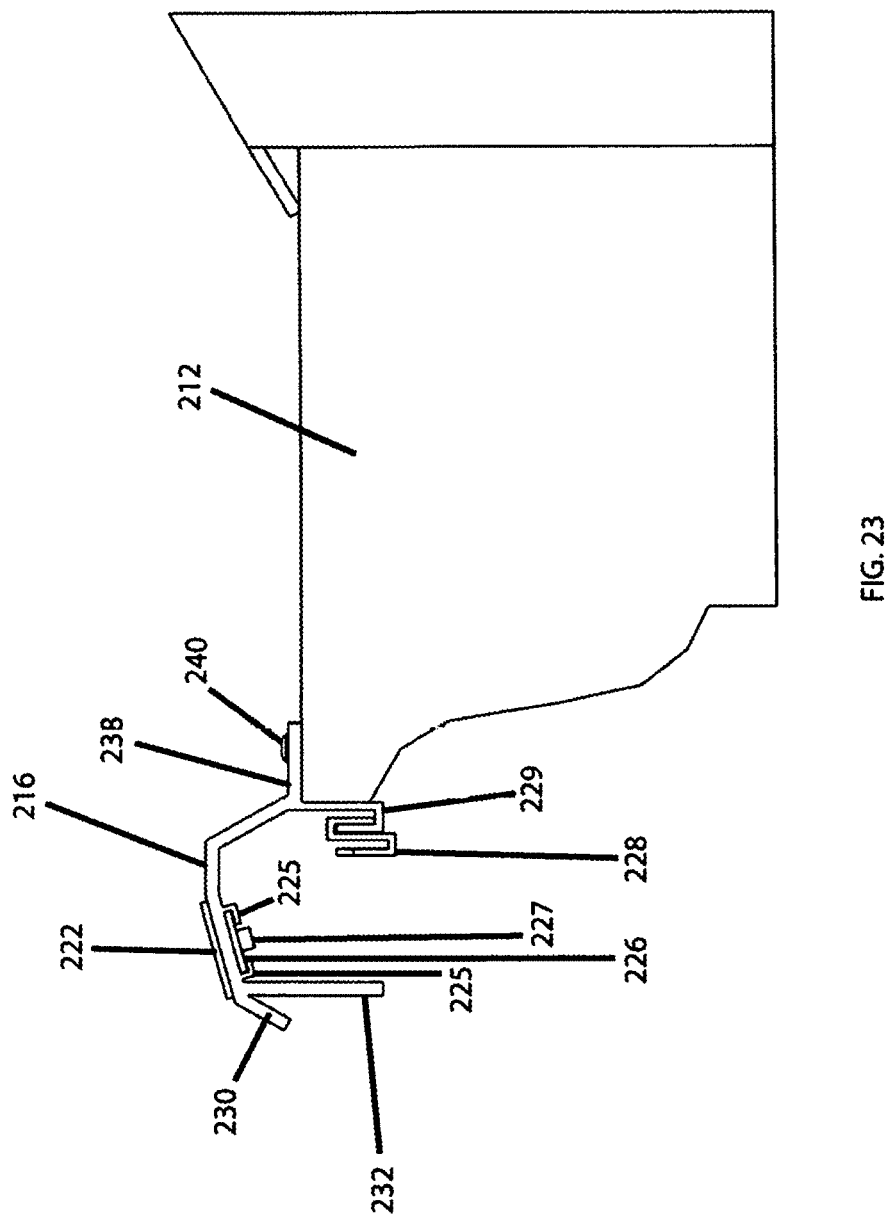
FIG. 23 is a side, cross-sectional view of an extrusion assembly of the disclosed technology.
Figure 24:
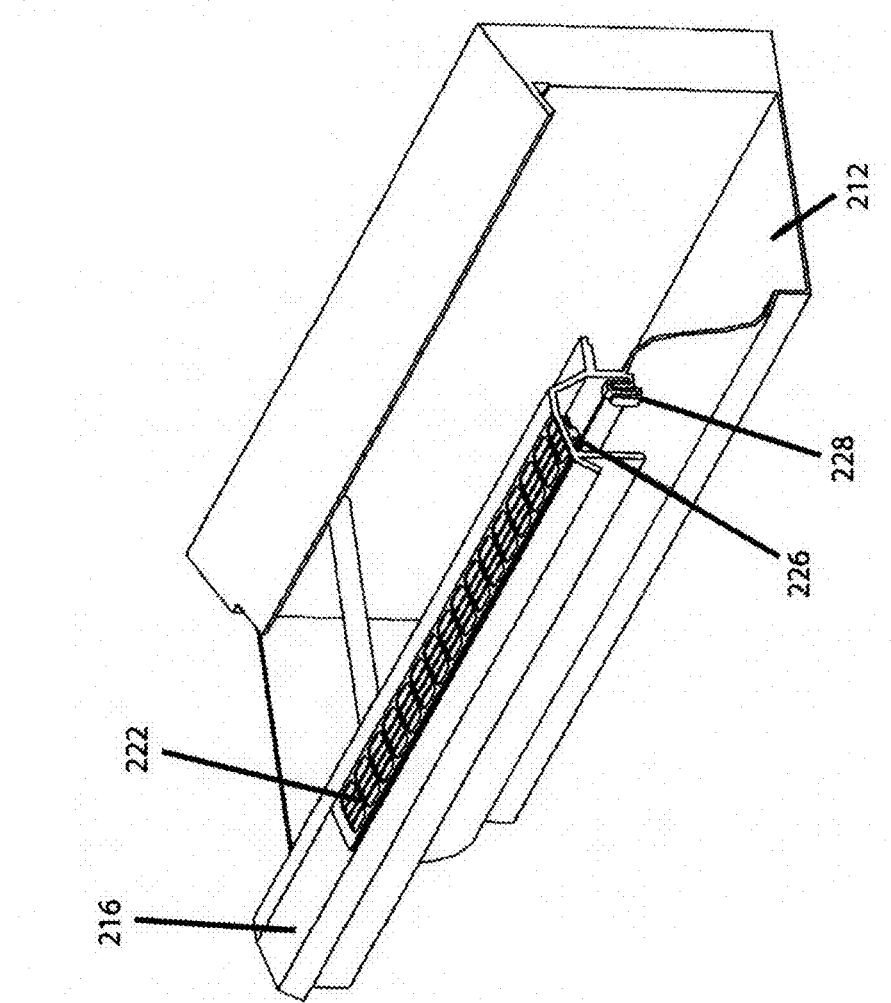
FIG. 24 is a perspective, cross-sectional view of an extrusion assembly of the disclosed technology.

Extending from top surface of the extrusion section 116 can be drip edge 130 that allows water to be directed away from the extrusion section 116 while the light shield 132 allows light to be directed downwards from the LED lighting strip 126. The hooking rail 129 can be located on a rear side of the extrusion section 116. The hooking rail 129 can be used to secure lighting hooks 128, as shown in FIGS. 14 and 23-24 or a decorative cover 142 as shown in FIGS. 19-20. The decorative cover 142 can be curved so as to cover a front and bottom of the roof gutter system 112. The decorative cover 142 can include flange 143 which attaches to the hooking rail 129 as shown in FIGS. 19-20. In some implementations, the decorative cover 142 can be copper, faux wood or any other decorative design.

As shown in FIGS. 12-17, the debris collector 110 can be rotated out of the roof gutter system 112 for removing the debris from the debris collector. In some implementations, a user can place a hooked or magnetic tip of a poling tool (shown in FIGS. 29-36) into the pull tab 118 of the lever 117. Once inserted, the user can apply downward pressure to the poling tool so that the lever 117 is moved downwards which in turn causes the collection assembly 111 to be rotated out of the gutter system 112. Once the debris collector 110 is placed in an inverted second position most if not all of the debris will fall out of the gutter and down to the ground. If some debris remains within the debris collector 110, a stream of a garden hose can be directed at the collection assembly 111 for clearing any remaining debris. After the collection assembly 111 is cleaned out, the user can push the lever 117 in an upwards direction with the poling tool. This motion causes the collection assembly 111 to rotate and allows the collection assembly 111 to return to its seated position covering the gutter system 112.

In some implementations, as shown in FIGS. 21-24, an extrusion section 216 can be installed as a standalone device for adding to the aesthetics of a gutter system 212. The extrusion section 216 can include a solar panel 222, an LED lighting strip 226, a drip edge 230, light shield 232, strip guides 225, hooking rail 229, attachment ledge 238, screws 240 and clips 228.

The solar panel 222 can be attached to a top surface of the extrusion section 216 and the LED lighting strip 226 can be attached to an underside of the top surface of the extrusion section 216 via strip guides 225. The solar panel 222 and the LED lighting strip 226 can be electrically connected to one another so that the solar panel 222 can power the LEDs 227 of the LED lighting strip 226. In some implementations, the LED lighting strip 226 can be electrically connected to a 110V power converter.

Extending from top surface of the extrusion section 216 can be drip edge 230 that allows water to be directed away from the extrusion section 216 while the light shield 232 allows light to be directed downwards from the LED lighting strip 226. On a rear side of the extrusion section 216, a hooking rail 229 can be used to secure hooks for hanging string lights 228, as shown in FIG. 23.

Figure 25:
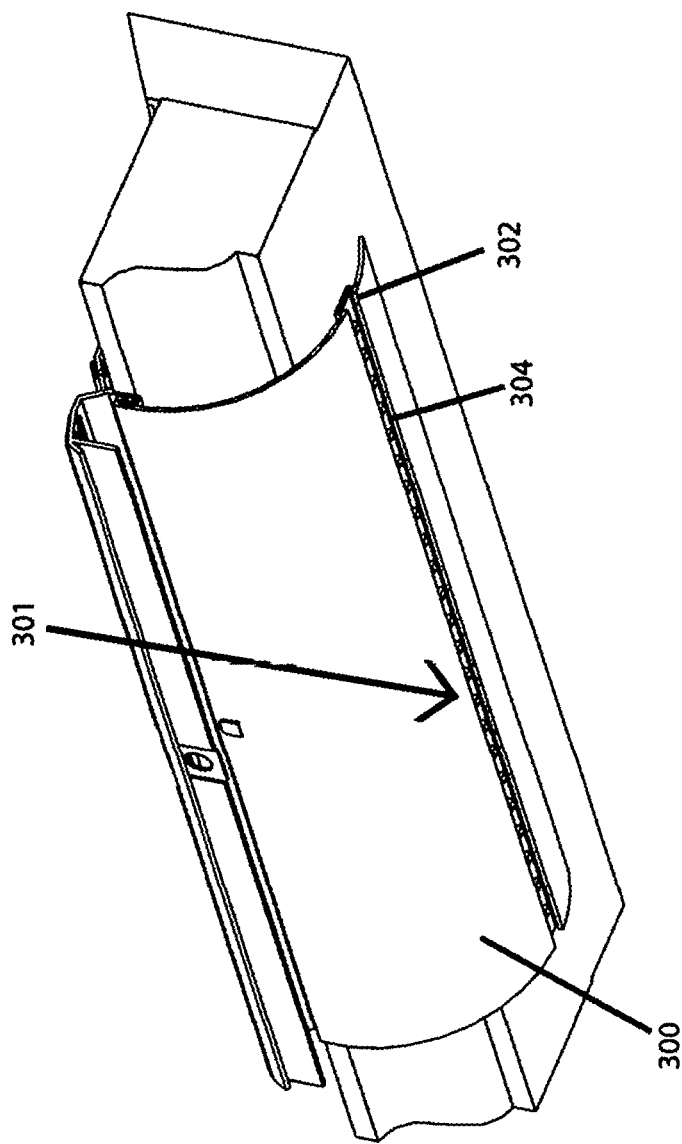
FIG. 25 is a perspective view of a debris collector of the disclosed technology with an attached decorative cover having a lighting system.
Figure 26:
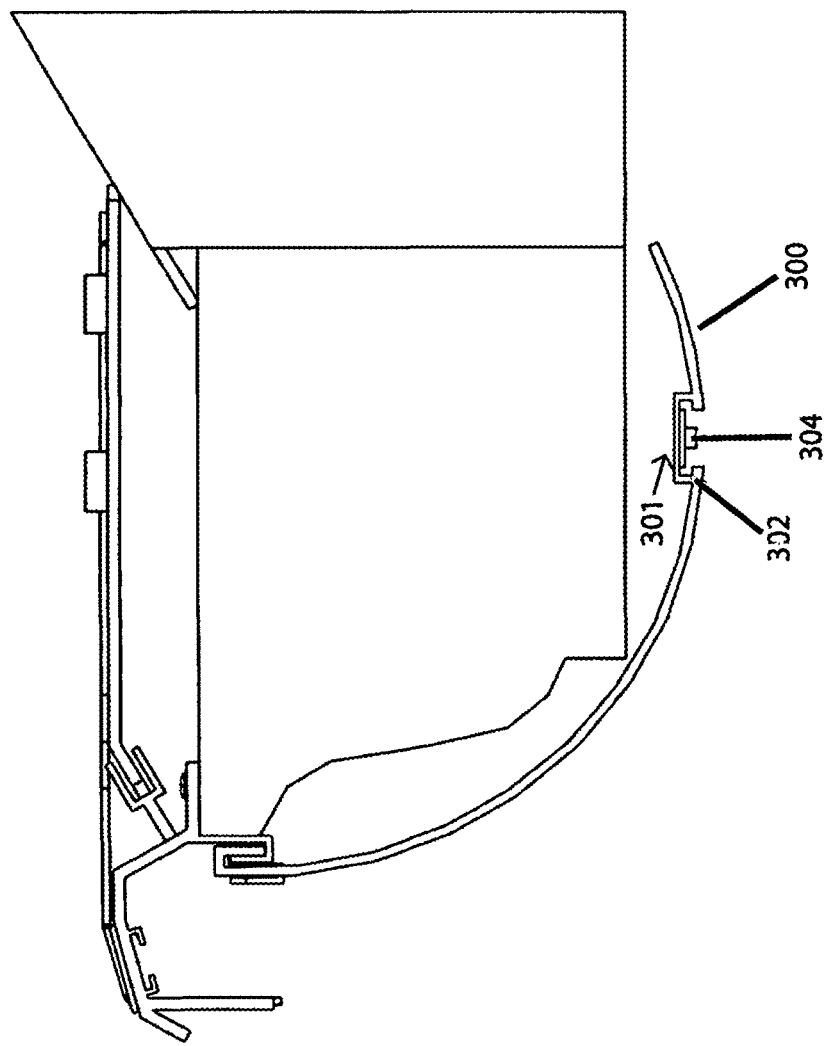
FIG. 26 is a cross-sectional view of a debris collector of the disclosed technology with an attached decorative cover having a lighting system.
Figure 27:
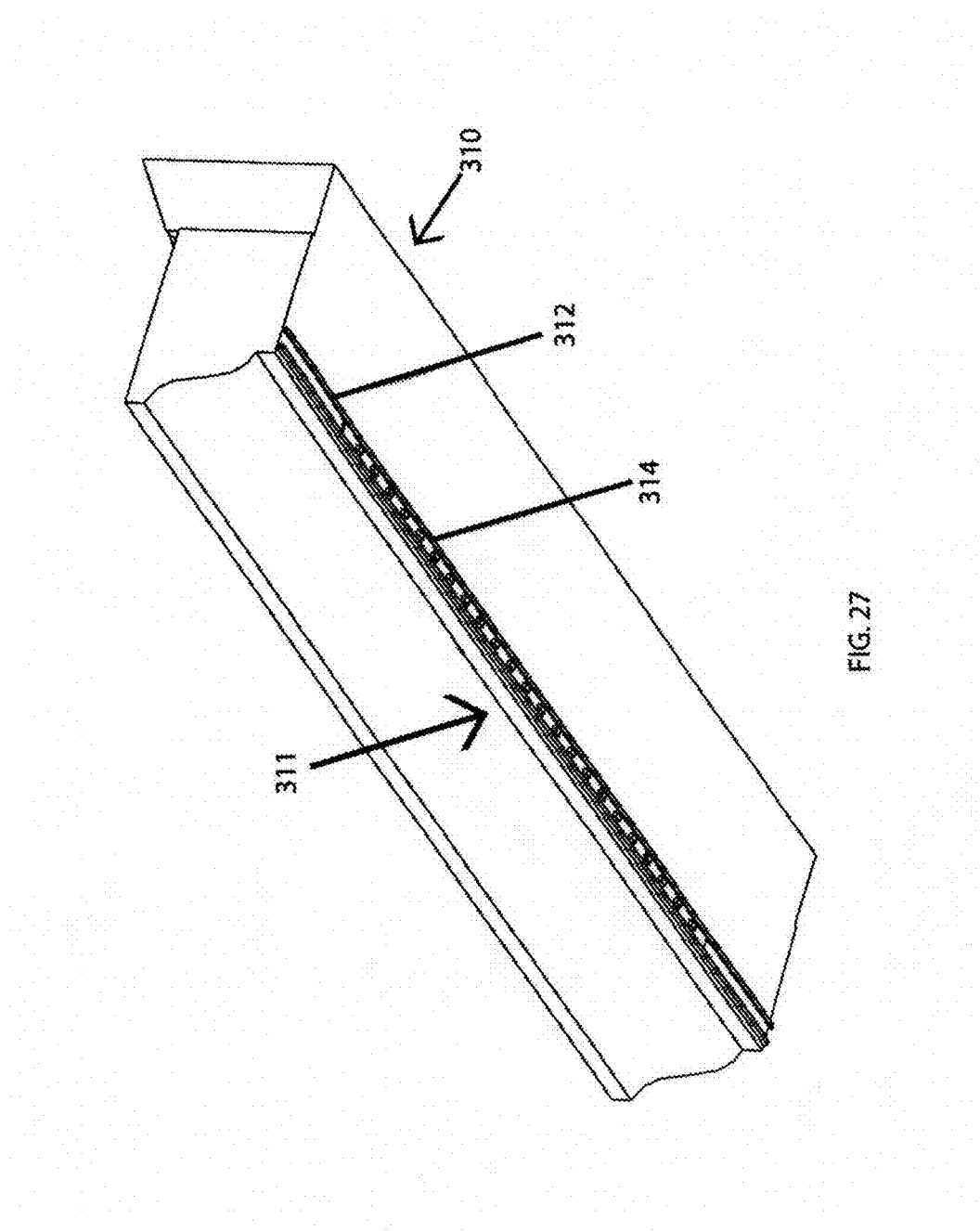
FIG. 27 is a perspective view of a gutter system of the disclosed technology having a lighting system.
Figure 28:
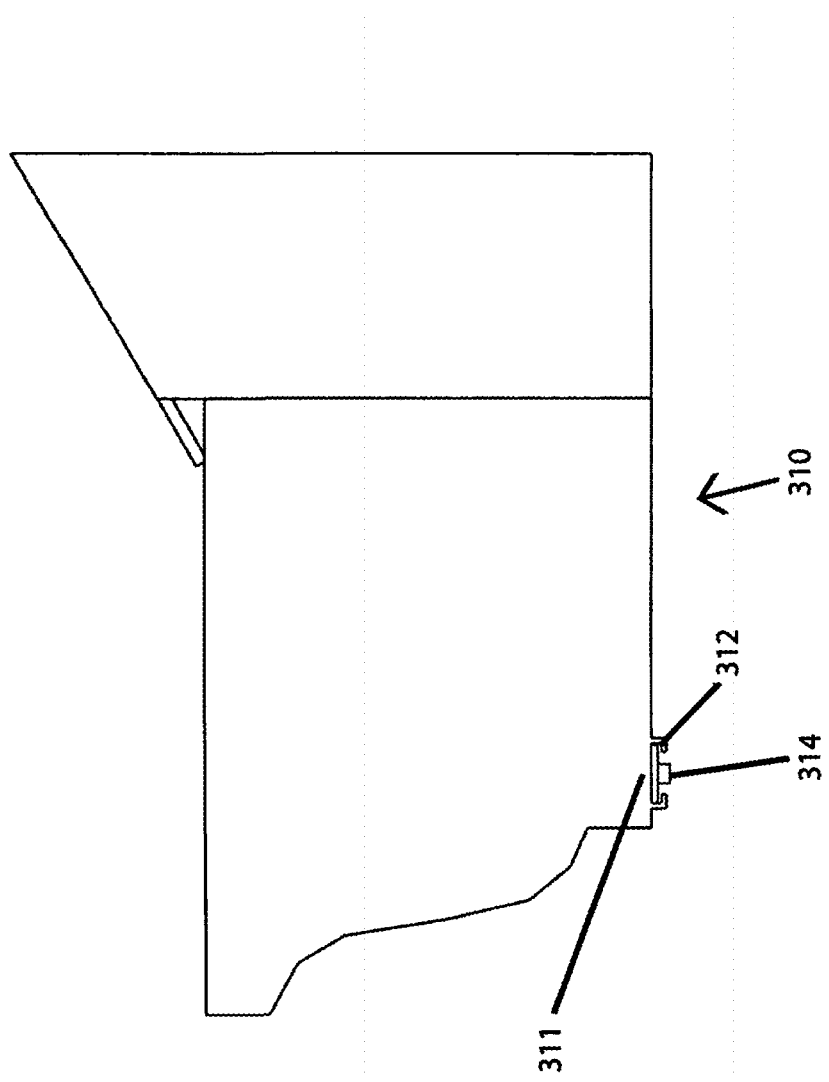
FIG. 28 is a cross-sectional view of a gutter system of the disclosed technology having a lighting system.

In some implementations, as shown in FIGS. 25 and 26, a decorative cover 300 can include lighting system 301, e.g., a LED guide 302 that attaches a LED lighting strip 304, however, other attachment mechanisms are contemplated. The LED guide 302 and the LED lighting strip 304 can be positioned on a bottom of the decorative cover 300 for distributing light. The LED lighting strip 304 can be powered by a solar panel, as described above, or by a D.C. power converter (not shown) supplied from a 110V power source. In some implementations, as shown in FIGS. 27 and 28, a gutter system 310 can include a lighting system, 311, e.g., a LED guide 312 that attaches an LED lighting strip 314. The LED guide 312 can be incorporated in the gutter system at time of manufacture or can be adhered to the gutter system 310 after installation through the use of an adhesive or some other attachment mechanism.

Figure 29:
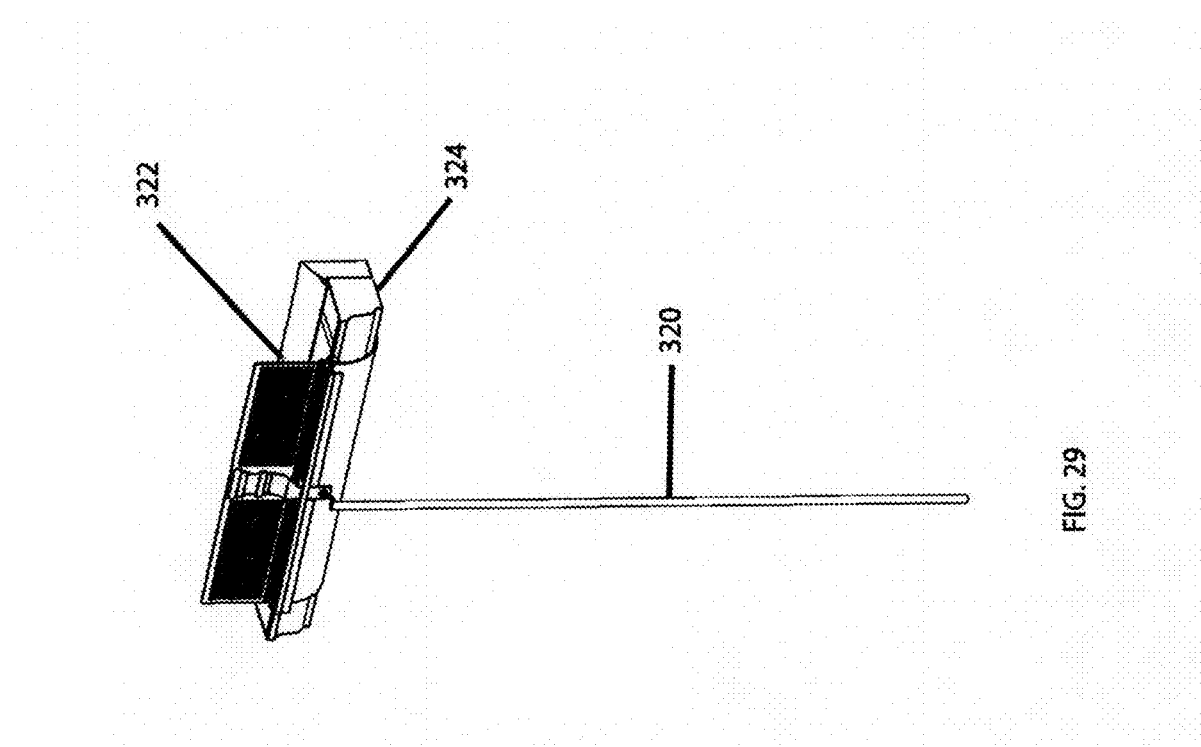
FIG. 29 is a perspective view of a debris collector of the disclosed technology along with a poling tool of the disclosed technology.
Figure 30:
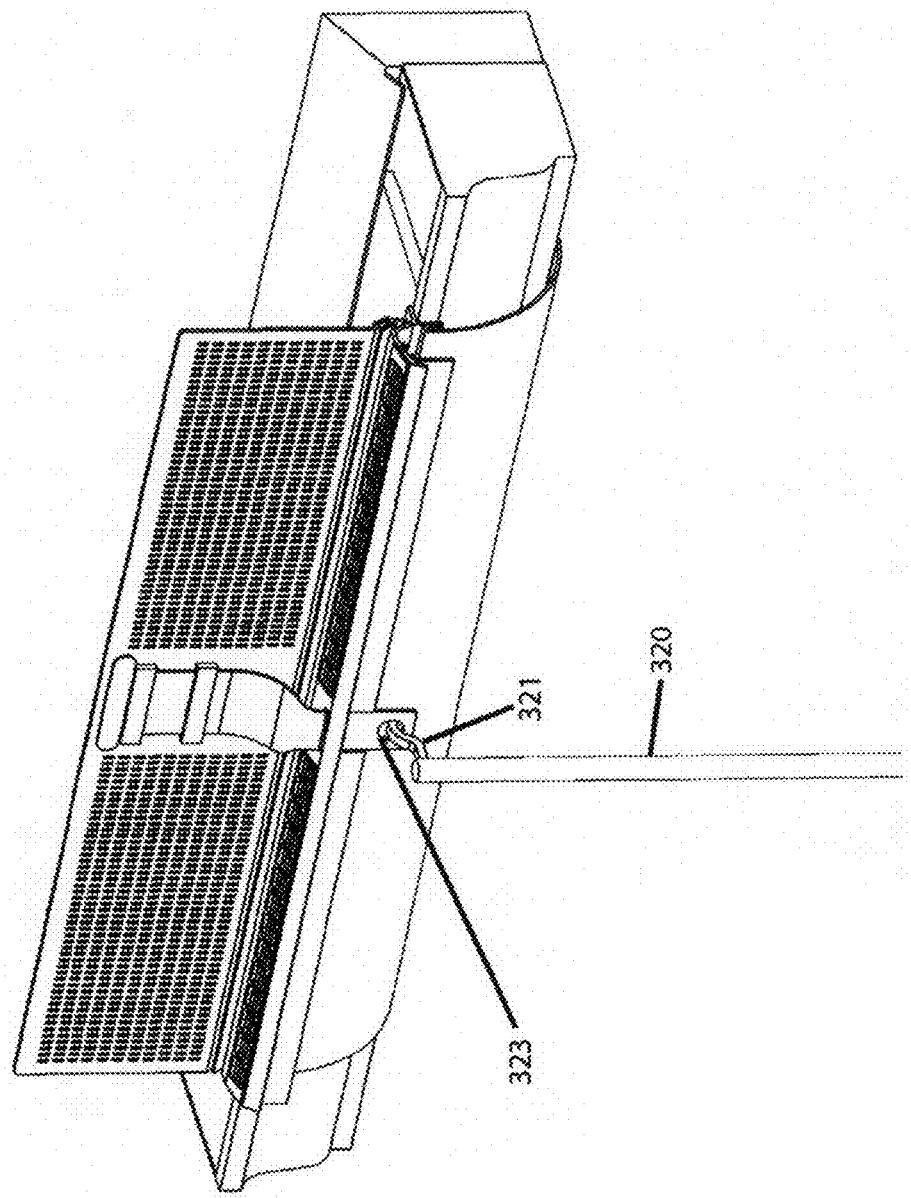
FIG. 30 is a perspective view of a debris collector of the disclosed technology along with a poling tool of the disclosed technology.

In some implementations, as shown in FIGS. 29-30, a poling tool 320 can used to rotate a debris collector 322 from a gutter system 324. In use, a tip 321 of the poling tool 320 can be inserted into a pull tab 323 of the debris collector 322. Once inserted, a user can apply downward pressure to the poling tool 320 so that debris collector 322 is rotated out of the gutter system 324 into an inverted, cleaning position. Once the debris collector 322 is placed in the inverted position most if not all of the debris will fall away from the debris collector 322 and down to the ground. If some debris remains within the debris collector 322, a stream of a garden hose can be directed at the debris collector 322 for clearing any remaining debris. After the debris collector 322 is cleaned out, the user can push the poling tool 320 in an upwards direction causing the debris collector 322 to rotate back to a seated position.

Figure 31:
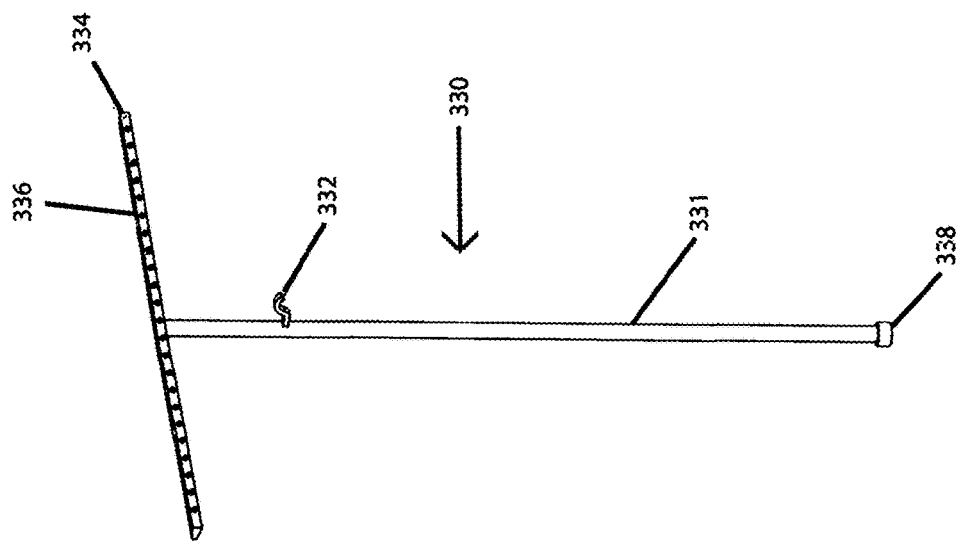
FIG. 31 is a perspective view of a poling tool of the disclosed technology having a cleaning head.
Figure 32:
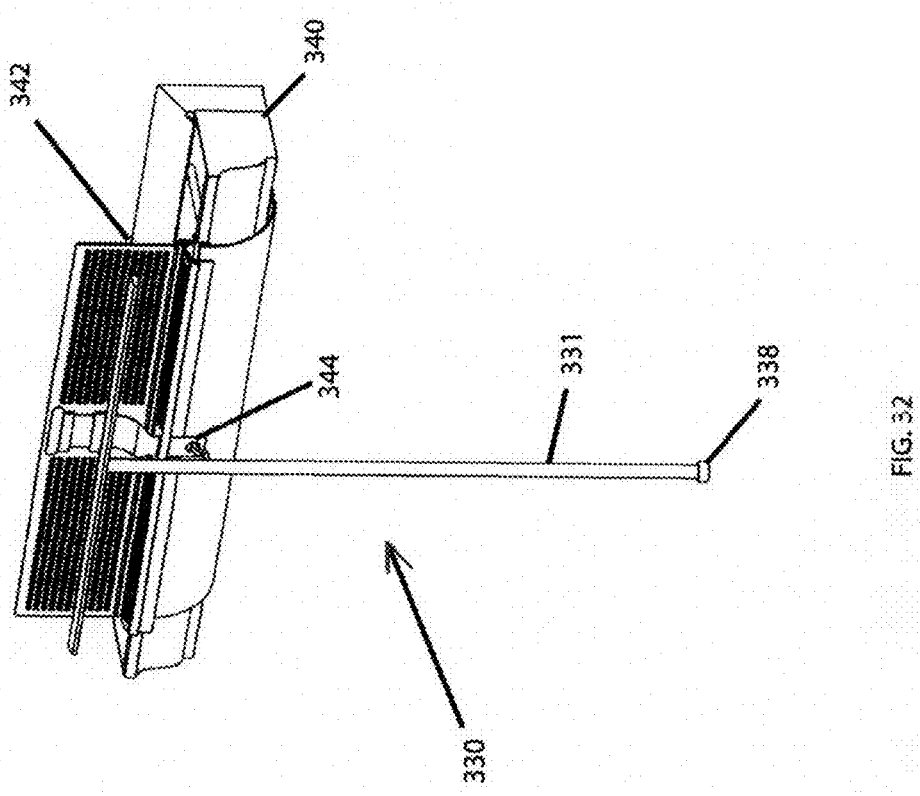
FIG. 32 is a perspective view of a debris collector of the disclosed technology along with a poling tool with a cleaning head of the disclosed technology.
Figure 33:
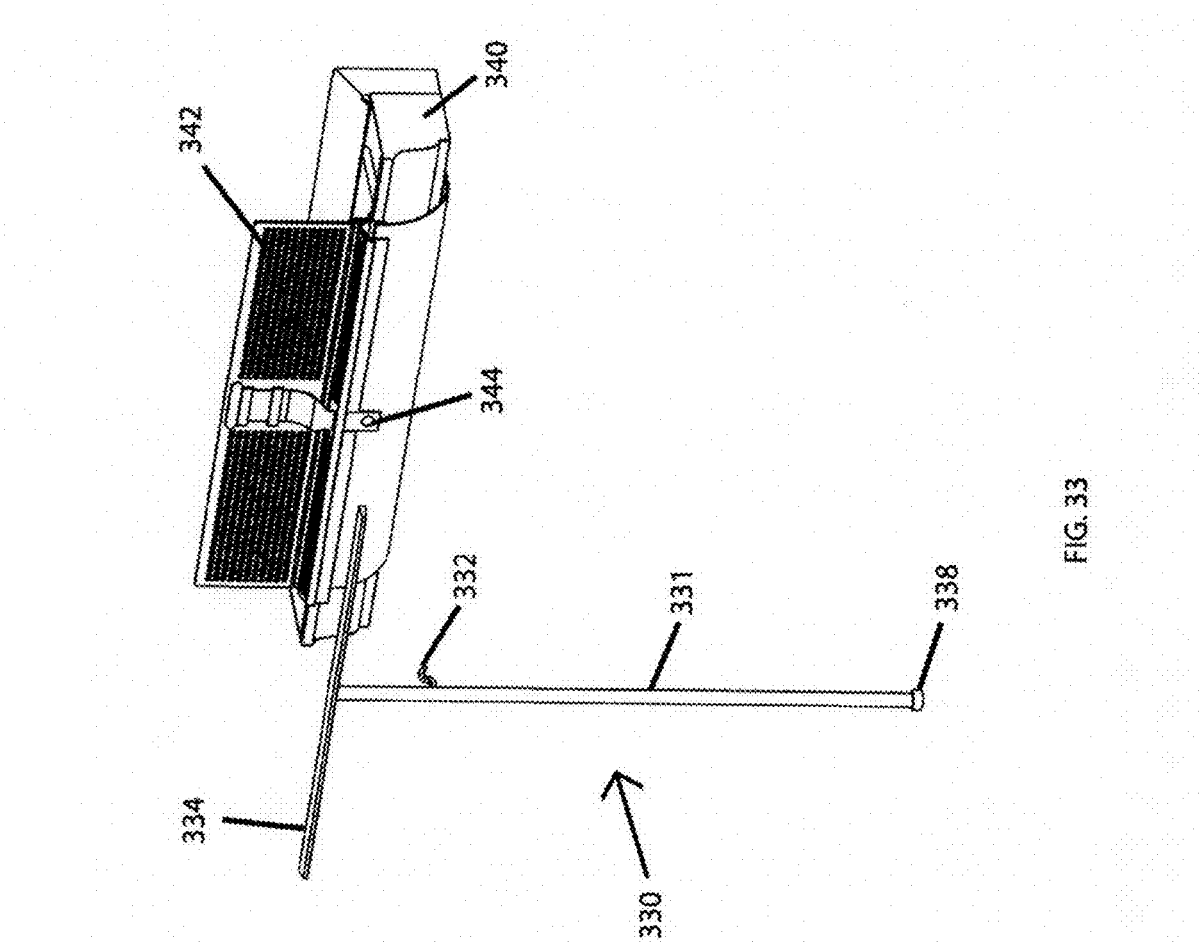
FIG. 33 is a perspective view of a debris collector of the disclosed technology along with a poling tool with a cleaning head of the disclosed technology.

In some implementations, as shown in FIGS. 31-33, a poling tool 330 is used to rotate a debris collector 342 from a gutter system 340. In use, a tip 332 of the poling tool 330 can be inserted a pull tab 344 of the debris collector 342. Once inserted, a user can apply downward pressure to the poling tool 330 so that debris collector 342 is rotated out of the gutter system 324 into an inverted, cleaning position. Once the debris collector 342 is placed in the inverted position most if not all of the debris will fall away from the debris collector 322 and down to the ground. In some implementations, the poling tool 330 can also include a hollow rod 331, a cleaning head 334 with nozzles 336 and a garden hose attachment 338. A garden hose (not shown) can be attached to the garden hose attachment 338. If some debris remains on the debris collector 342, a water stream from a garden hose can be directed up the hollow rod 331 to the cleaning head 334 and out of the nozzles 336. The water stream can be directed at a face of the debris collector 342 for clearing any remaining debris. After the debris collector 342 is rinsed, the user can push the poling tool 330 in an upwards direction causing the debris collector 342 to rotate to its seated position covering the gutter system 340. In some implementations, the poling tool 330 can include a valve for controlling the on/off and the pressure of the water stream.

Figure 34:
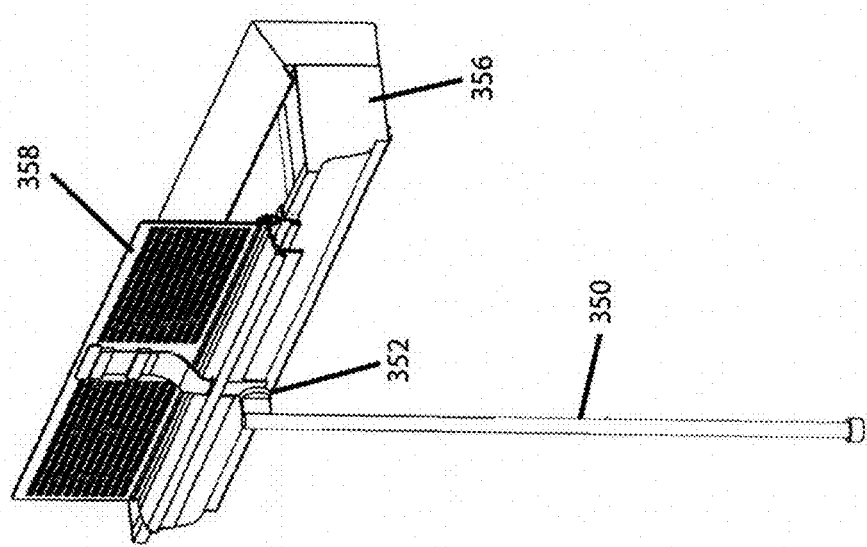
FIG. 34 is a perspective view of a debris collector of the disclosed technology along with a magnetic poling tool of the disclosed technology.
Figure 35:
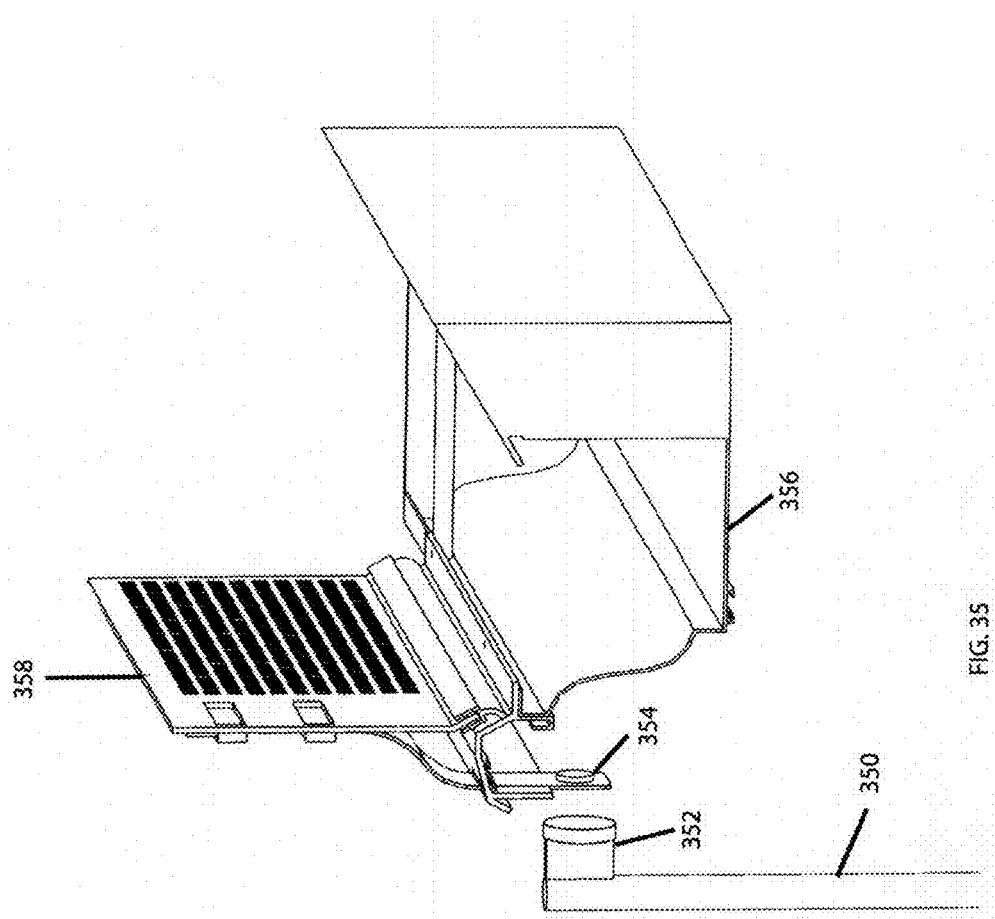
FIG. 35 is a perspective view of a debris collector of the disclosed technology along with a magnetic poling tool of the disclosed technology.
Figure 36:
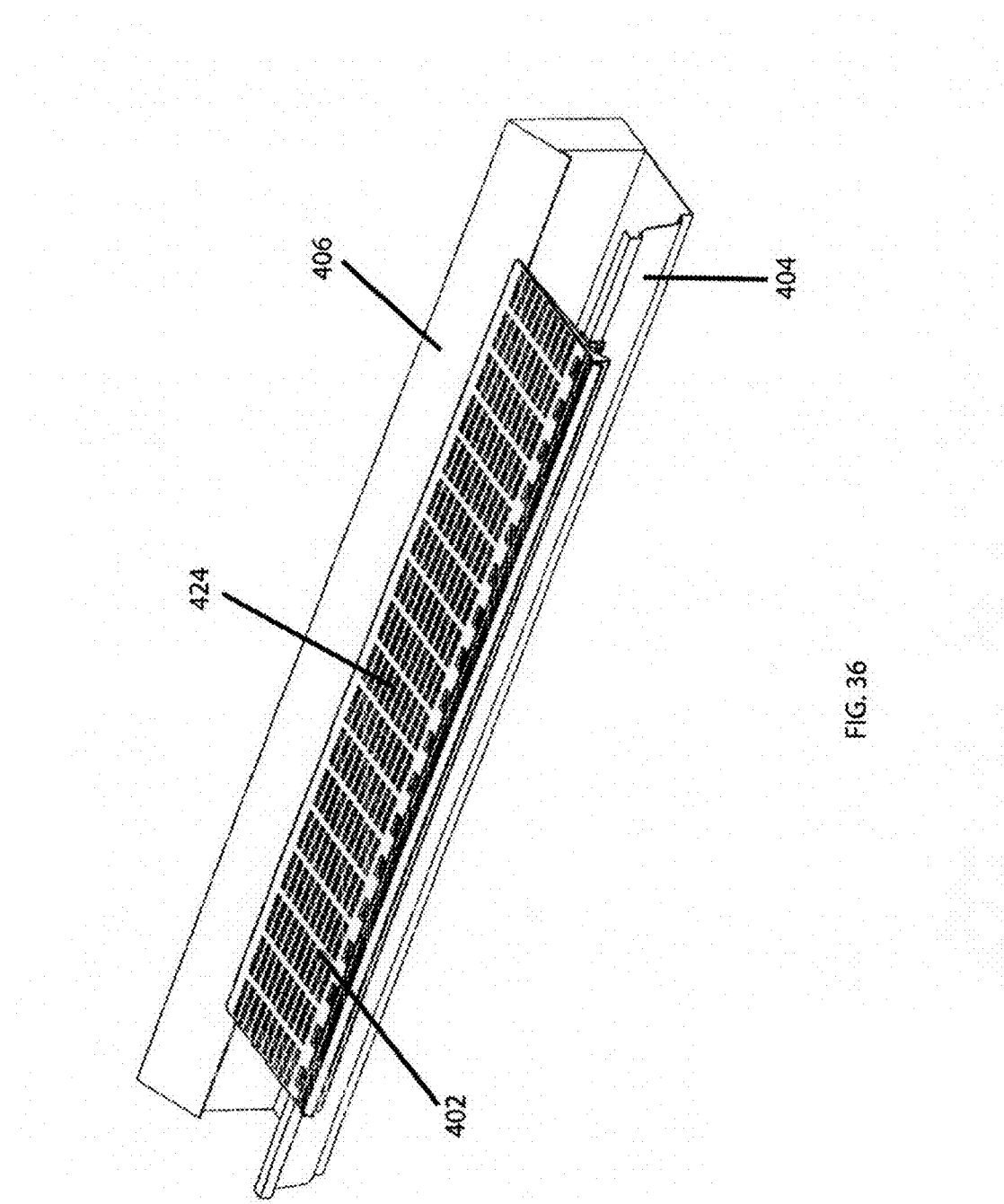
FIG. 36 is a perspective view of a debris collector of the disclosed technology in a first position.

In some implementations, as shown in FIGS. 34-35, a poling tool 350 can be used to rotate a debris collector 358 out of a gutter system 356. In use, a magnetic tip 352 of the poling tool 350 can be magnetically attracted to a magnetic pull tab 354 of the debris collector 358. Once magnetically secured to one another, a user can apply downward pressure to the poling tool 350 so that debris collector 358 is rotated out of the gutter system 356 into an inverted, cleaning position. Once the debris collector 358 is placed in the inverted position most if not all of the debris will fall away from the debris collector 358 and down to the ground. If some debris remains within the debris collector 358, a stream of a garden hose can be directed the debris collector 358 for clearing any remaining debris. After the debris collector 358 is cleaned out, the user can push the poling tool 350 in an upwards direction causing the debris collector 358 to rotate to its seated position. The user can then laterally slide the poling tool to the left or right so that the magnetic attraction between the magnetic tip 352 and the magnetic pull tab 354 can be removed.

Figure 38:
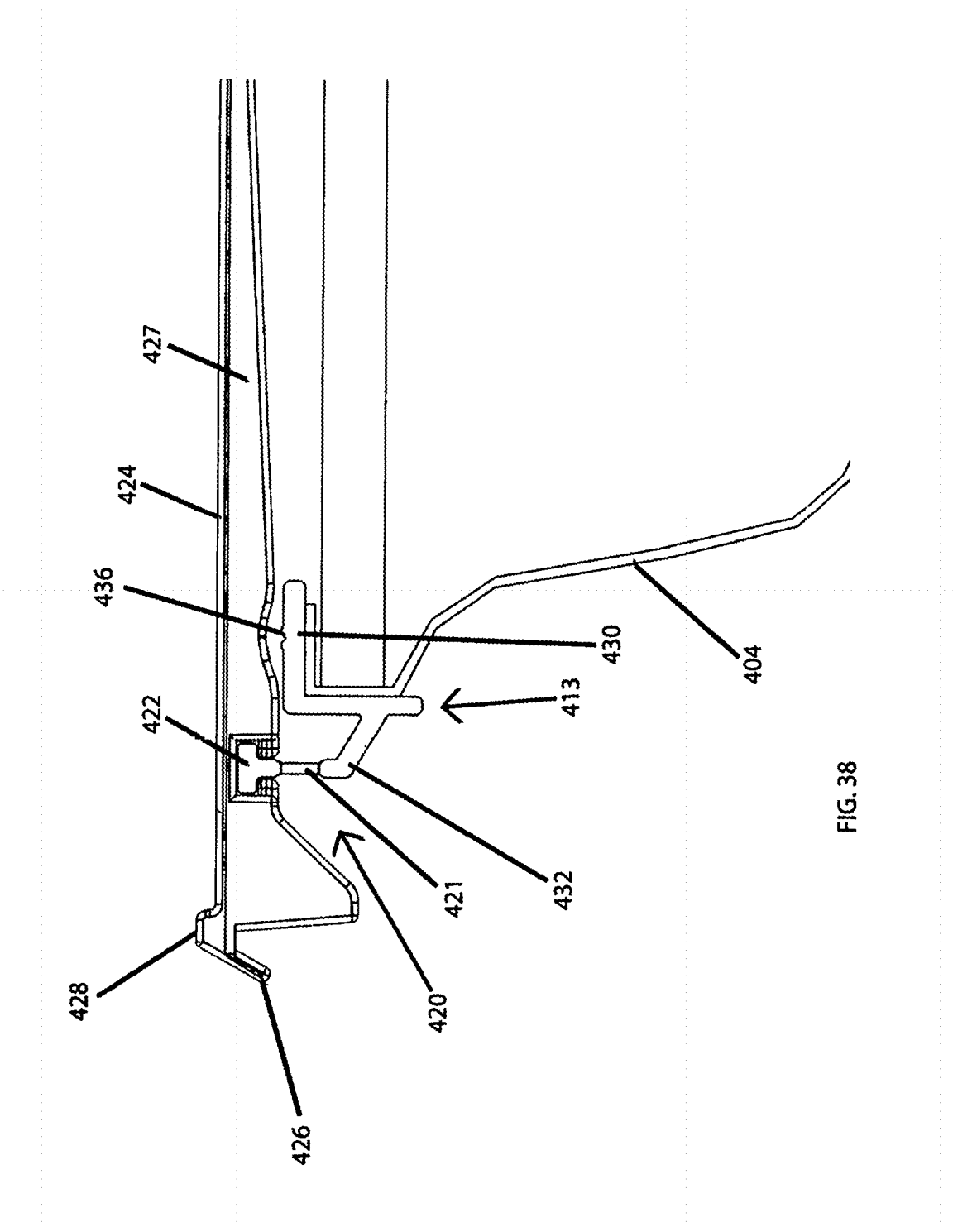
FIG. 38 is an exploded view of the cross-sectional view shown in FIG. 37.
Figure 39:
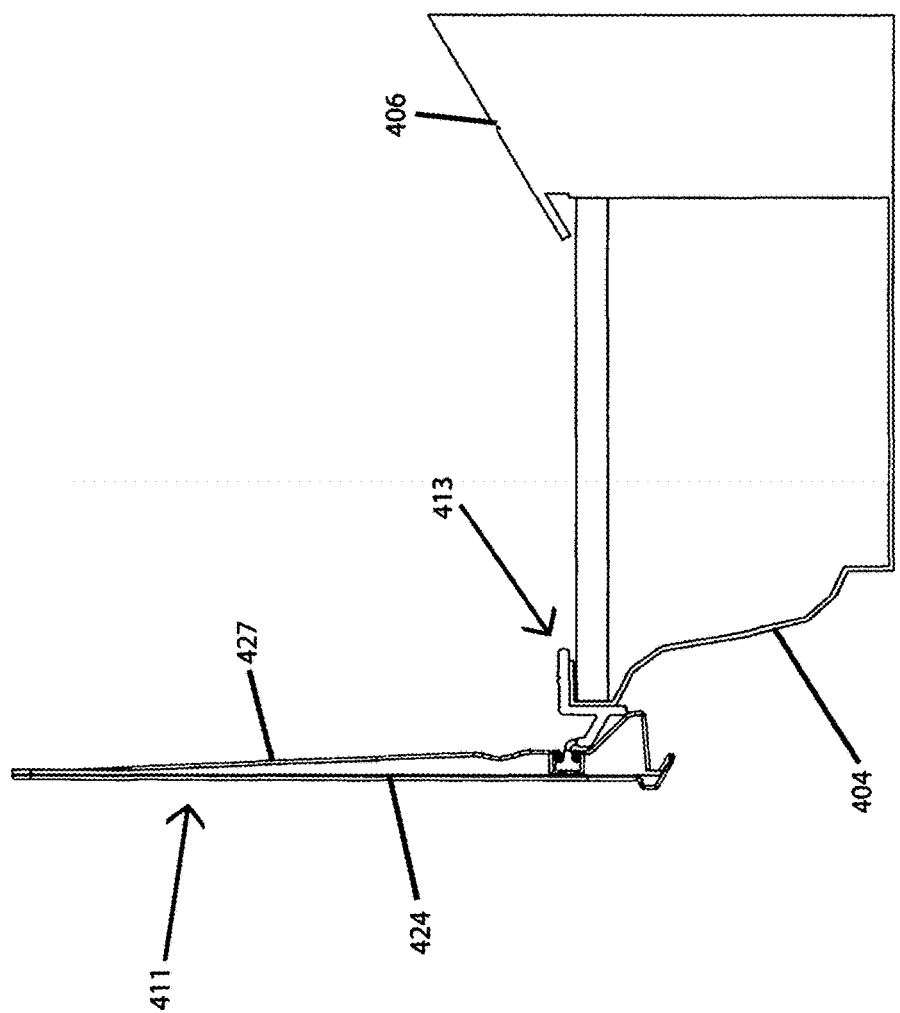
FIG. 39 is a cross-sectional view of the debris collector shown in FIG. 36 in a second position.
Figure 43:
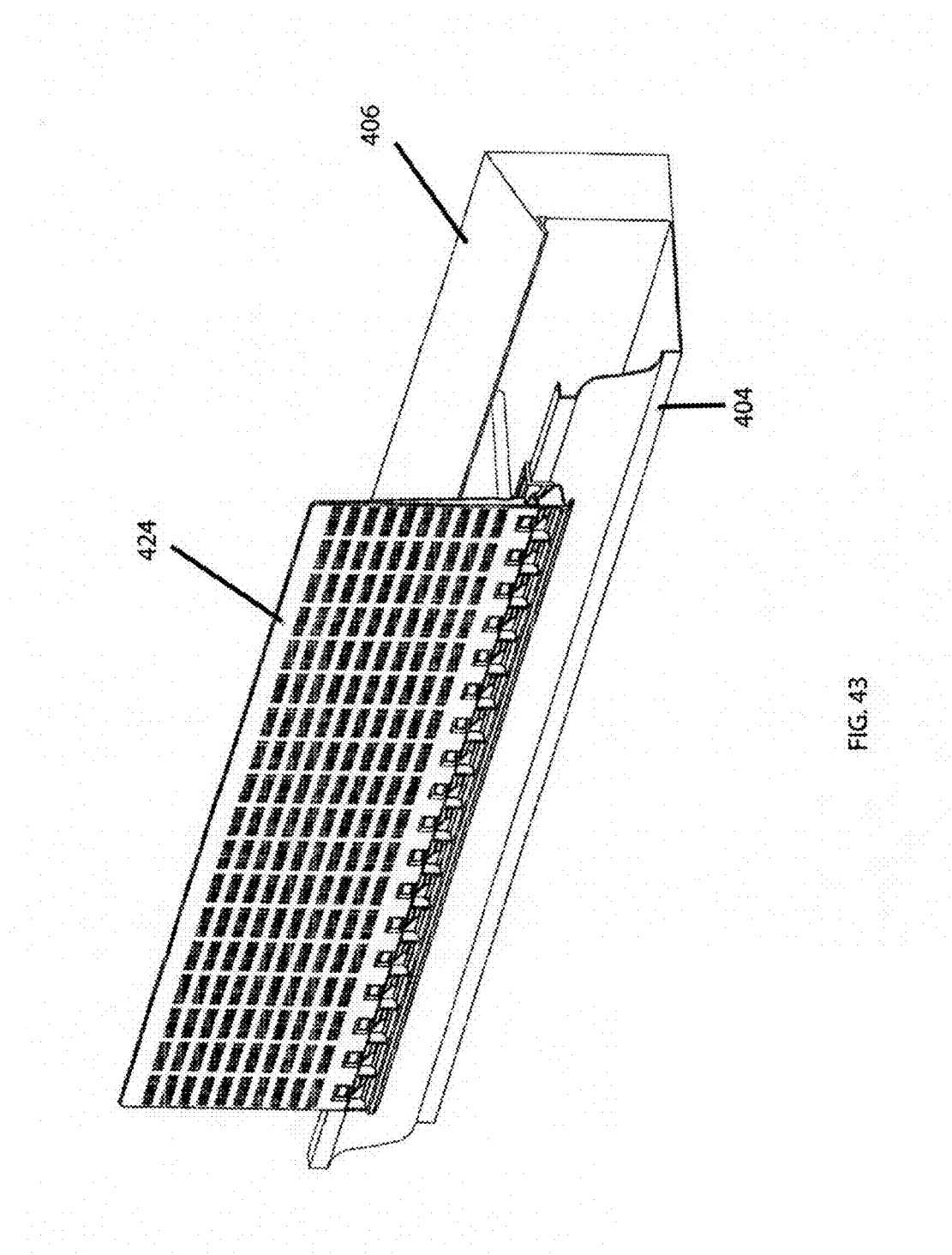
FIG. 43 is a perspective view of the debris collector shown in FIG. 36 in a second position.
Figure 44:
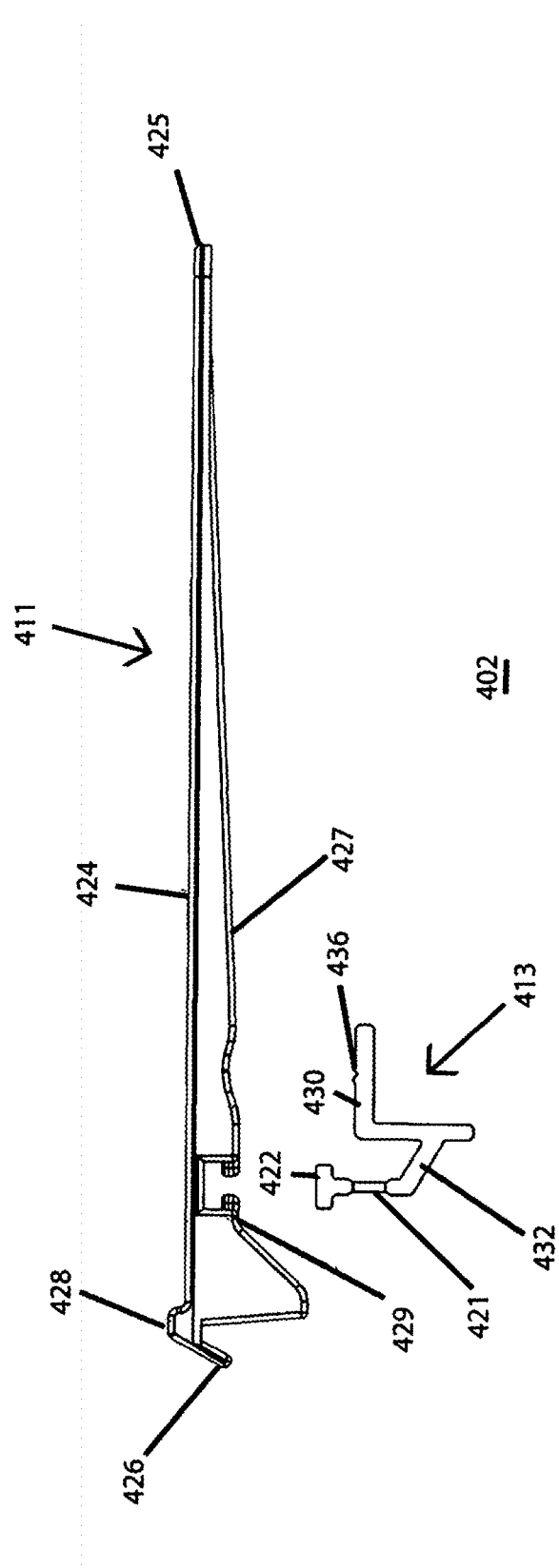
FIG. 44 is a cross-sectional view of a collection assembly and a mounting assembly shown in FIG. 36 in a disassembled state.
Figure 45:
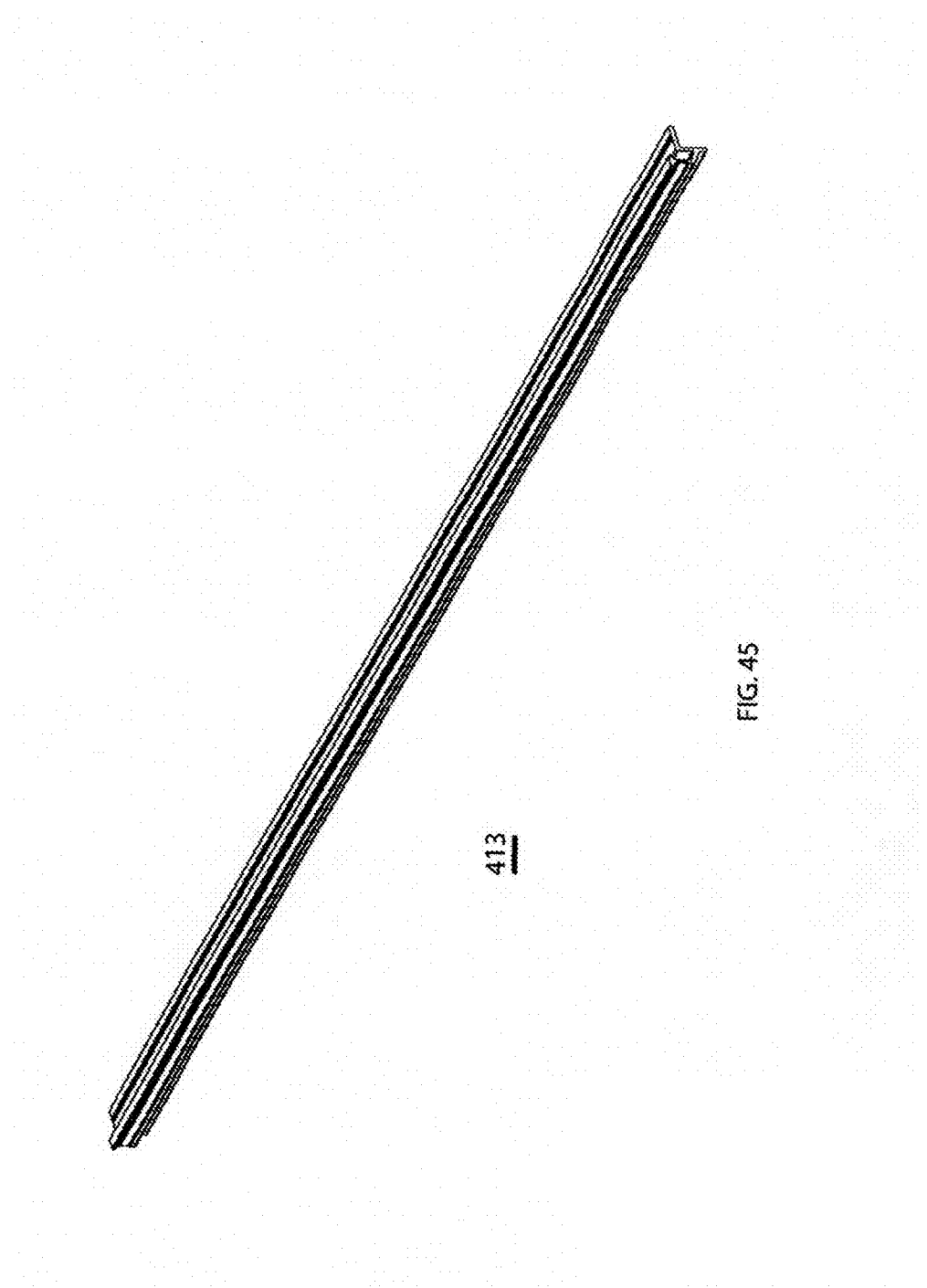
FIG. 45 is a perspective view a mounting assembly of the debris collector shown in FIG. 36.
Figure 46:
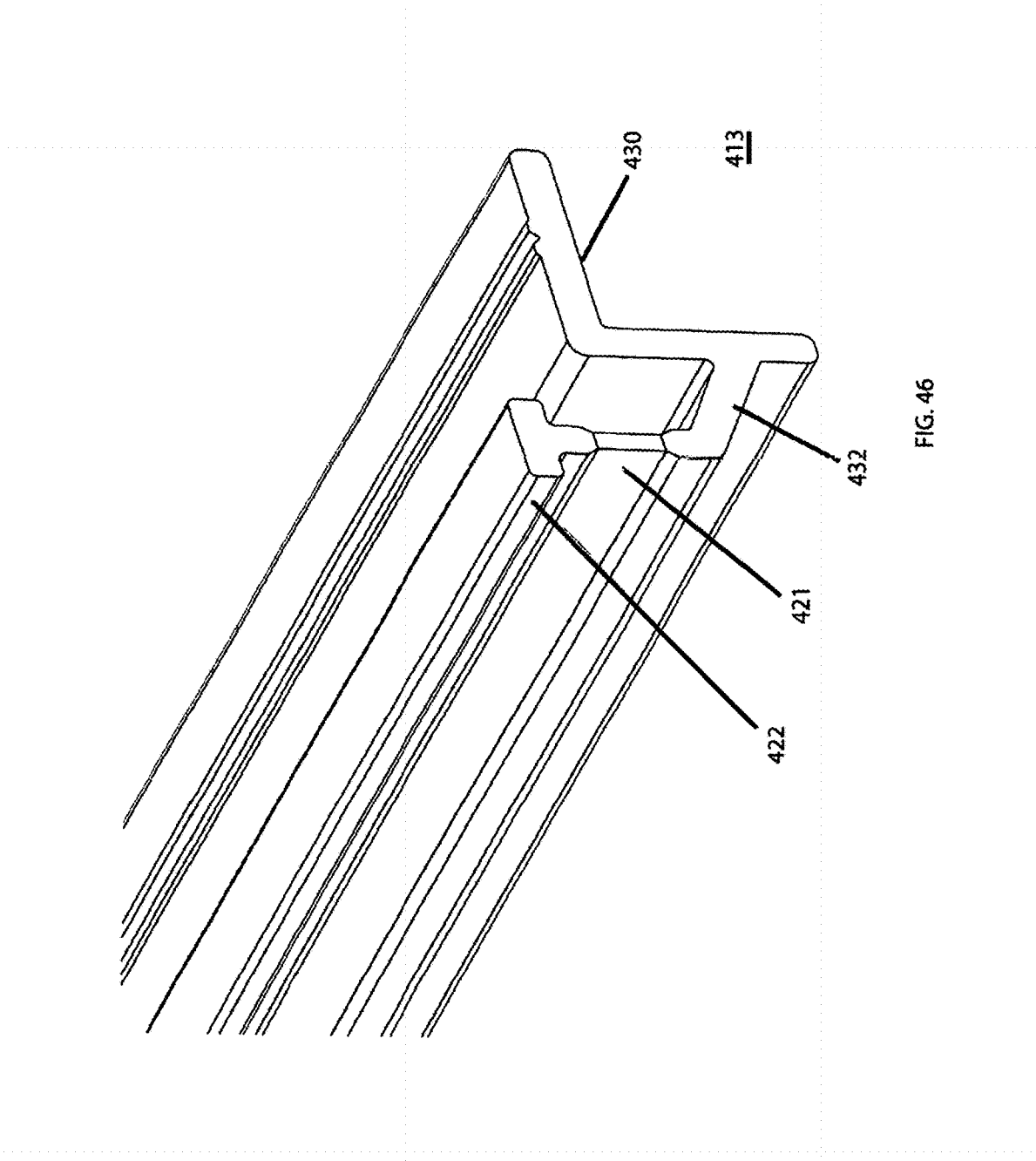
FIG. 46 is an exploded view of the mounting assembly shown in FIG. 45.
Figure 47:
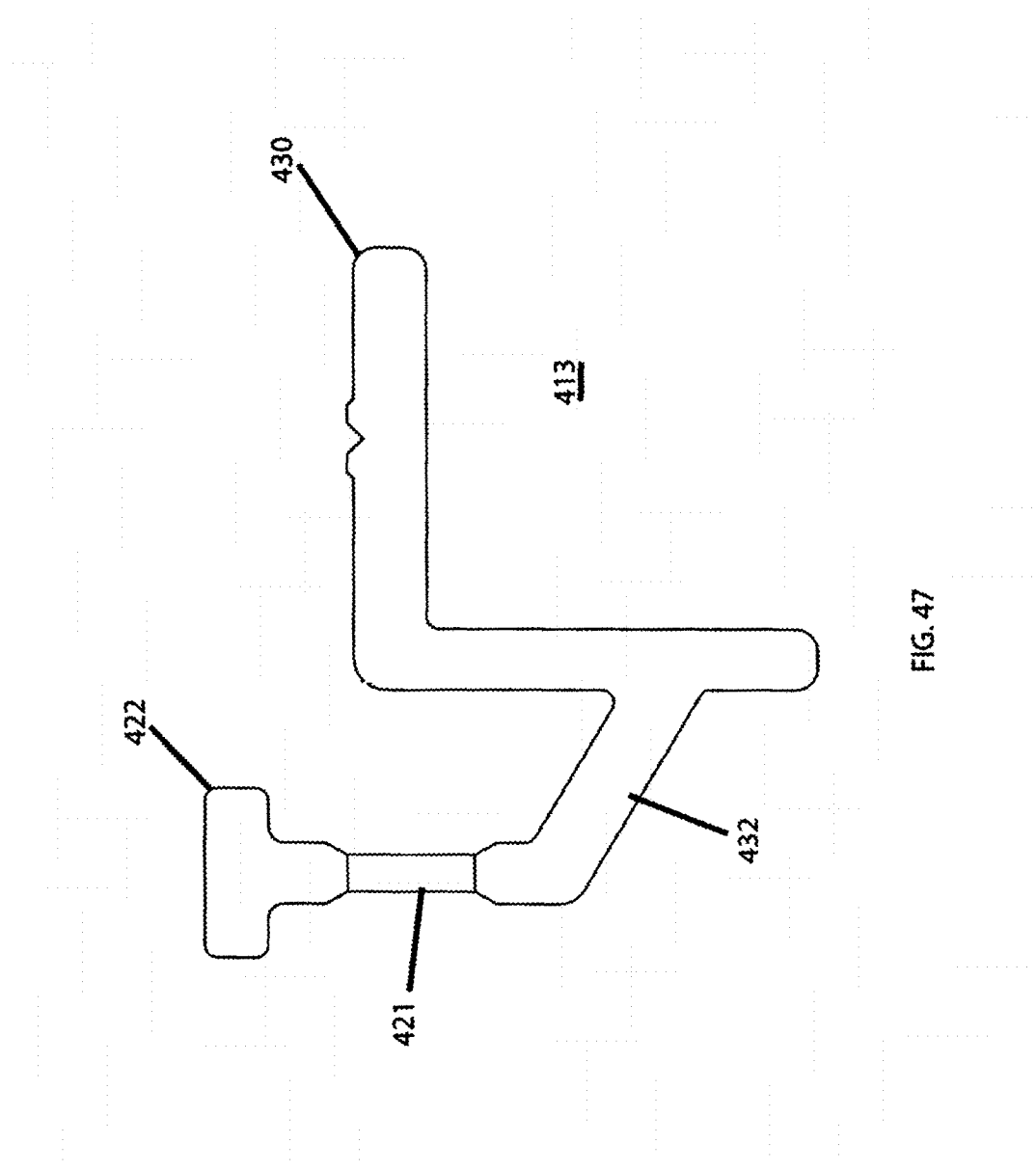
FIG. 47 is a side view of the mounting assembly shown in FIG. 45 in a first position.
Figure 48:
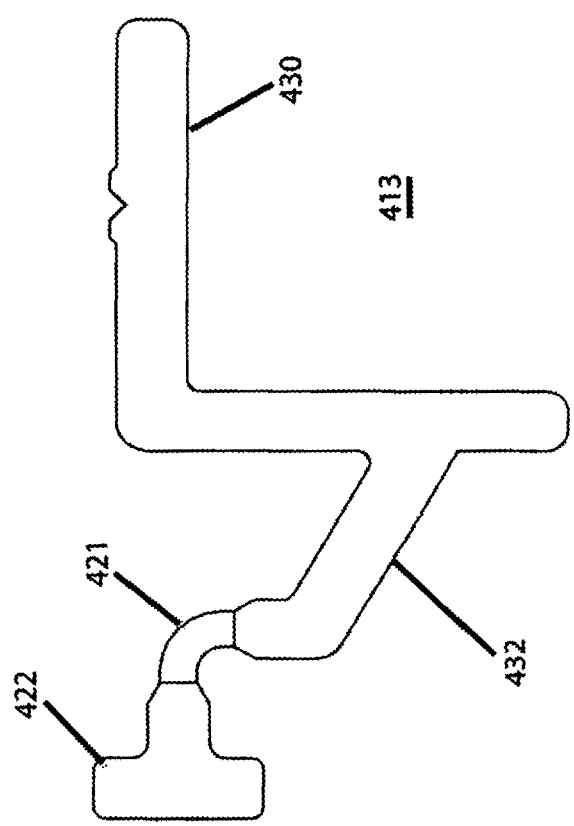
FIG. 48 is a side view of the mounting assembly shown in FIG. 45 in a first position.
Figure 49:
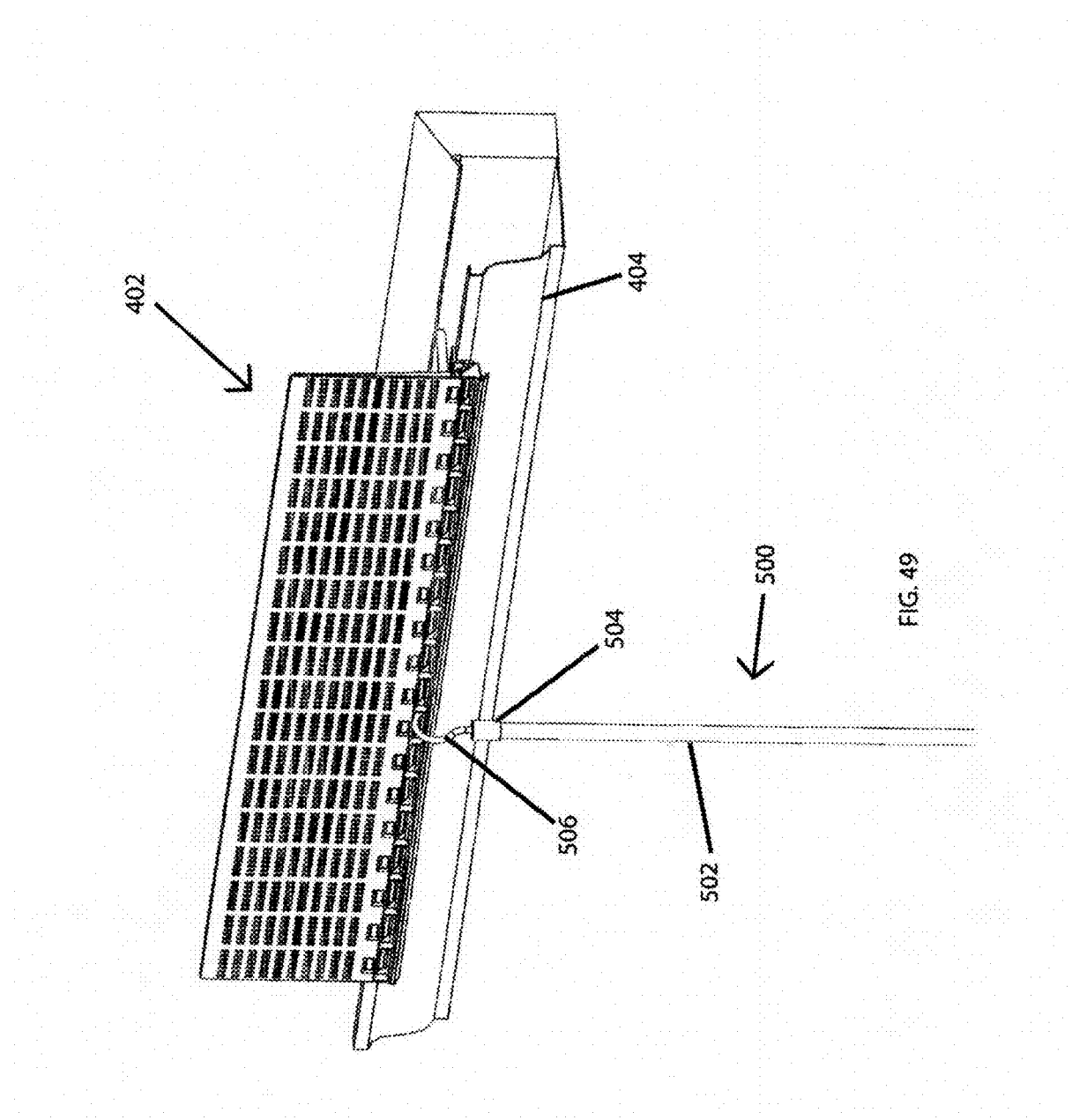
FIG. 49 is a perspective view of the debris collector of FIG. 36 in a second position with a poling tool.
Figure 50:
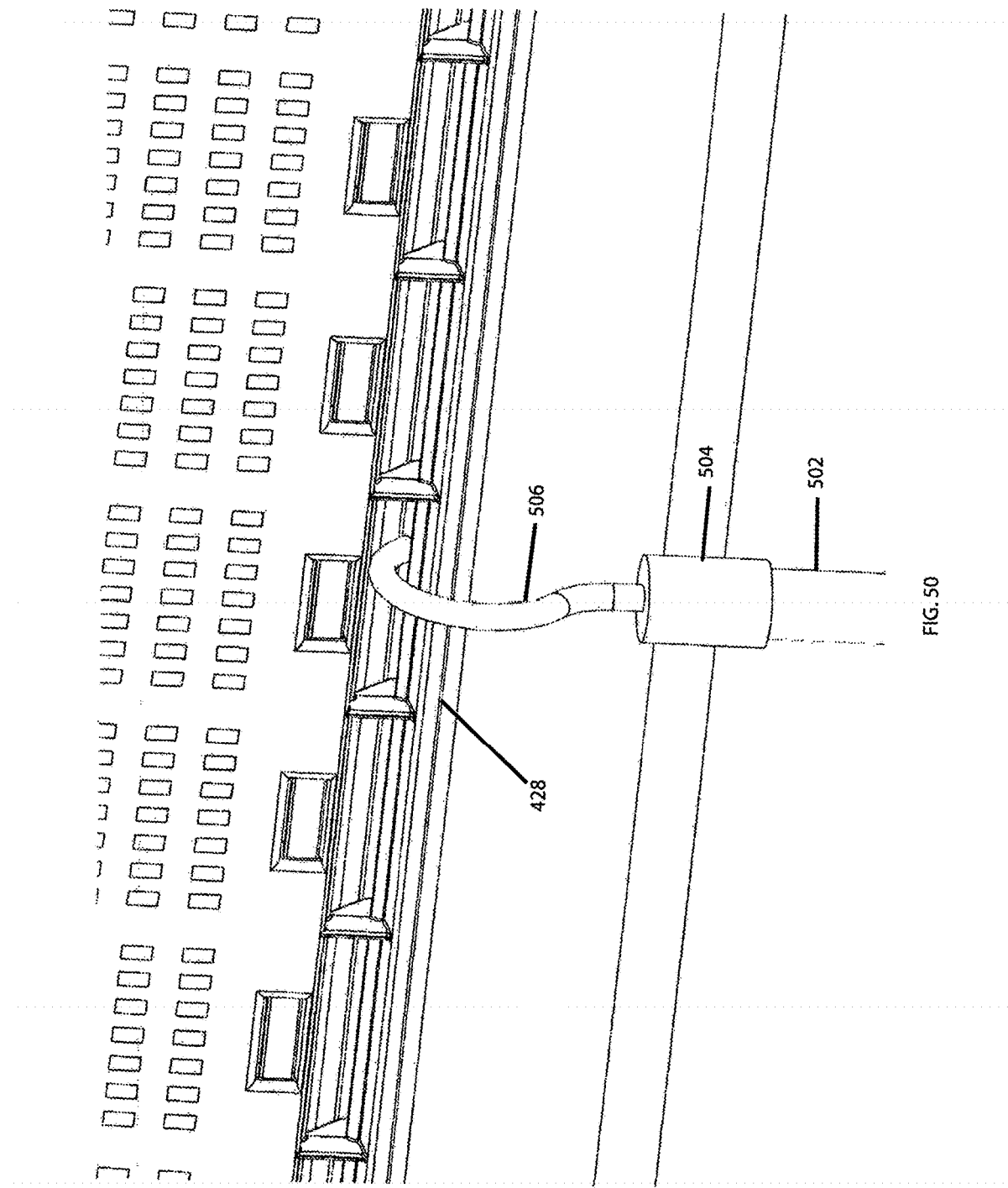
FIG. 50 is an exploded view of the debris collector and the poling tool shown in FIG. 49.

In some implementations, as shown in FIGS. 36-48, a debris collector 402 installed on a gutter 404 can include a collection assembly 411 and a mounting assembly 413. The collection assembly 411 and the mounting assembly 413 can be movably connected to each other with a hinge 420. The hinge 420 allows the debris collector 402 to move from a first position, shown in FIGS. 36-38, to a second position, shown in FIGS. 39-40 and 43. The first position allows debris to collect on a surface of the collection assembly 411 and the second position allows for removal of the debris from the collection assembly 411.

In some implementations, the collection assembly 411 can be a single unit formed from an injection molding process using polymers, thermoplastics, thermosets, elastomers and combinations thereof, e.g., including but not limited to, polyester, polyphenylene, polypropylene, polystyrene and polyvinyl. In other implementations, the collection assemblies can be made from malleable metallic materials and/or other plastic compositions and components.

The collection assembly 411 of the debris collector 402 can include a screen section 424, a reinforcement structure 427, a front section 426 and a back edge 425.

In some implementations, the screen section 424 can be laid out in a grid pattern with a top surface of the screen section 424 being substantially flat and rectangular but other configurations are contemplated. The grid pattern of the screen section 424 allows water to flow onto and through the screen section 424 of the debris collector 402 but retains any debris that collects on a top surface of the screen section 424.

Figure 37:
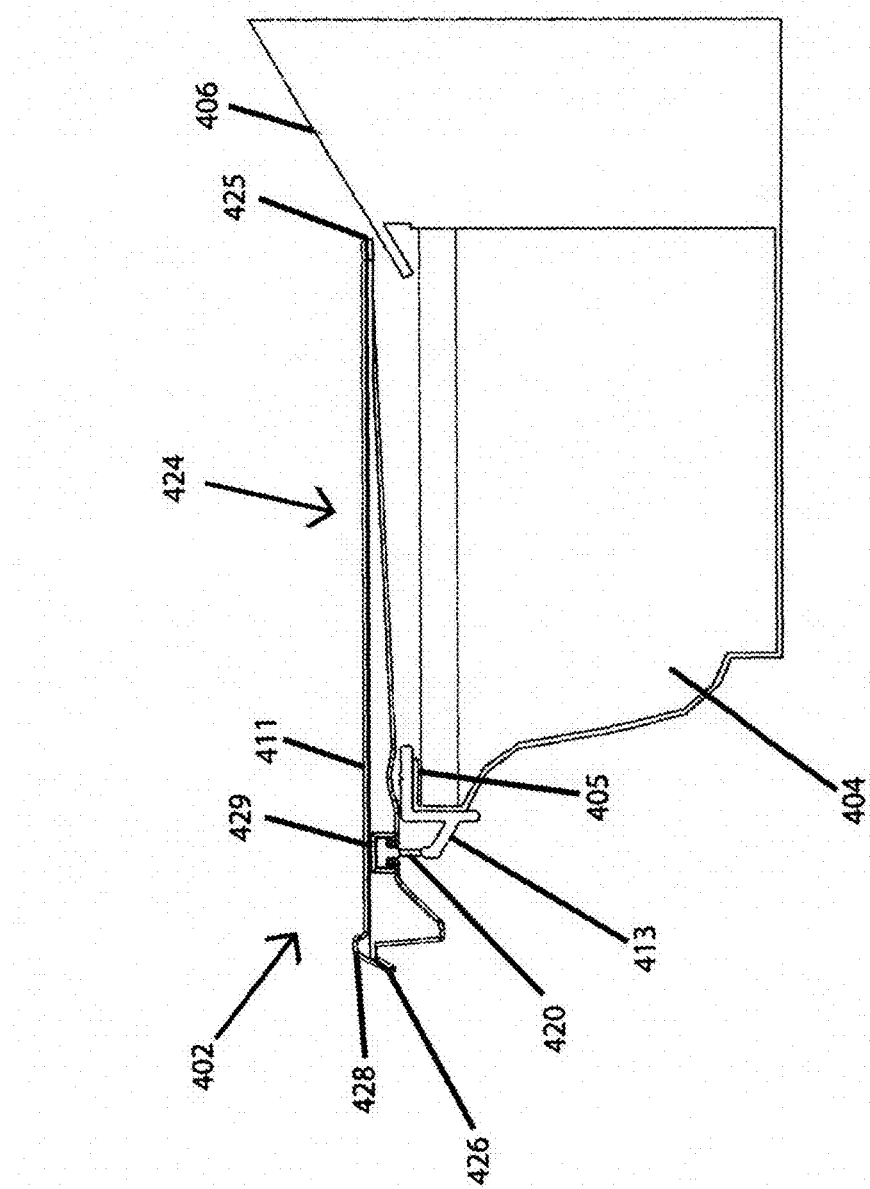
FIG. 37 is a cross-sectional view of the debris collector shown in FIG. 36 in a first position.

The back edge 425 of the debris collector 402 is capable of resting on or in close proximity to a roof 406, as shown in FIG. 37. In use, the back edge 425 allows water and debris to flow from a roof surface over the screen section 424.

The front section 426 of the debris collector 402 can include a grab rail 428. The grab rail 428 can be positioned along the front section 426 of the collection assembly 411, but other configurations are contemplated. The grab rail 428, when actuated by a poling tool 500, as shown in FIGS. 49-53, acts as a lever and allows the debris collector 402 to be moved from the first position to the second position and vice versa. In use, a user can rotate the debris collector 402 from the first position to a second position via the hinge 420.

The front section 426 of the debris collector 402 can also include a tee receiver guide 429 for receiving the hinge 420. That is, the tee receiver guide 429 can comprise fingers 429a, 429b for slidably receiving a tee section 422 of the hinge 420, shown in FIG. 42 and described more fully below.

Figure 40:
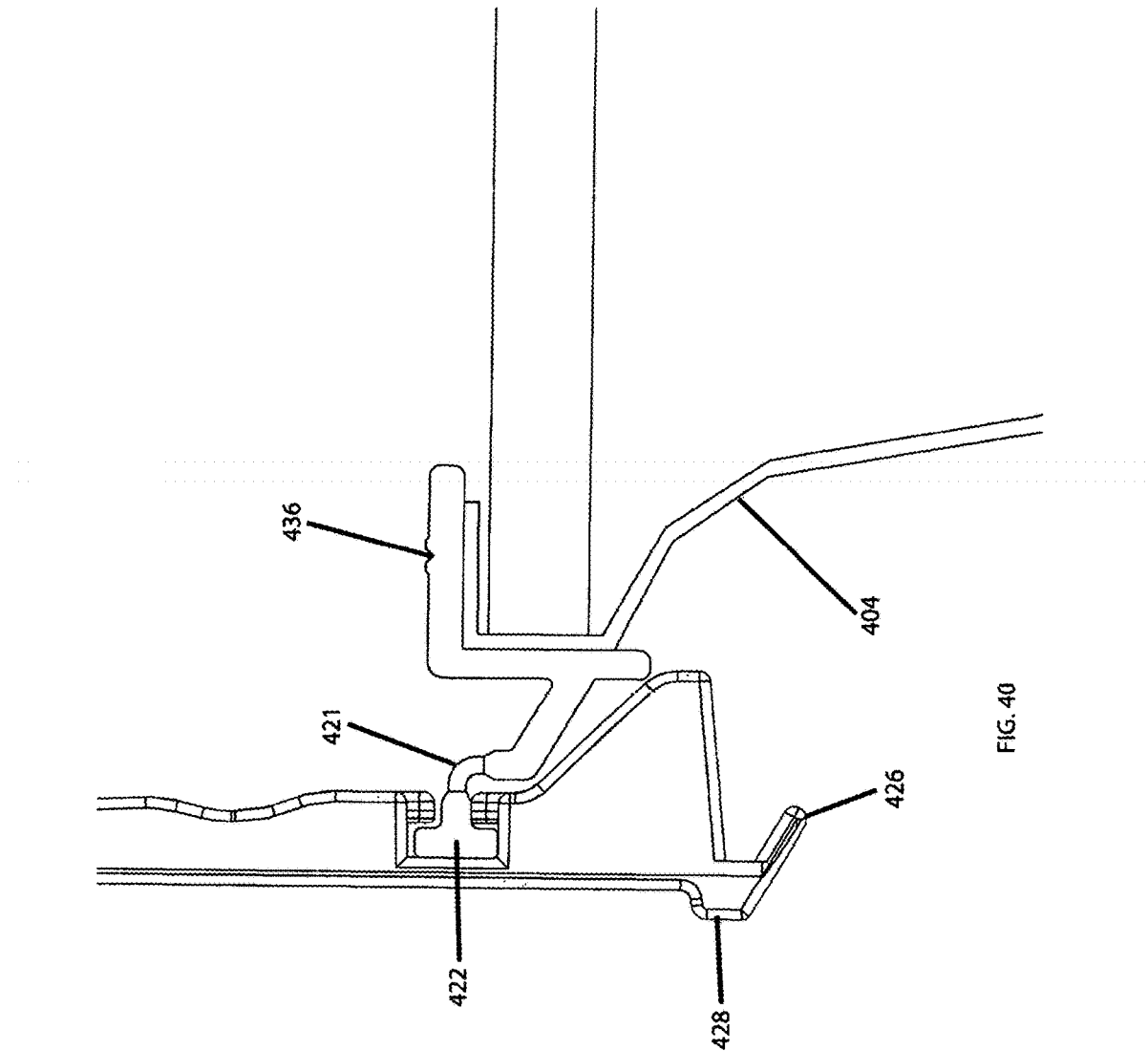
FIG. 40 is an exploded view of the cross-sectional view shown in FIG. 39.
Figure 41:
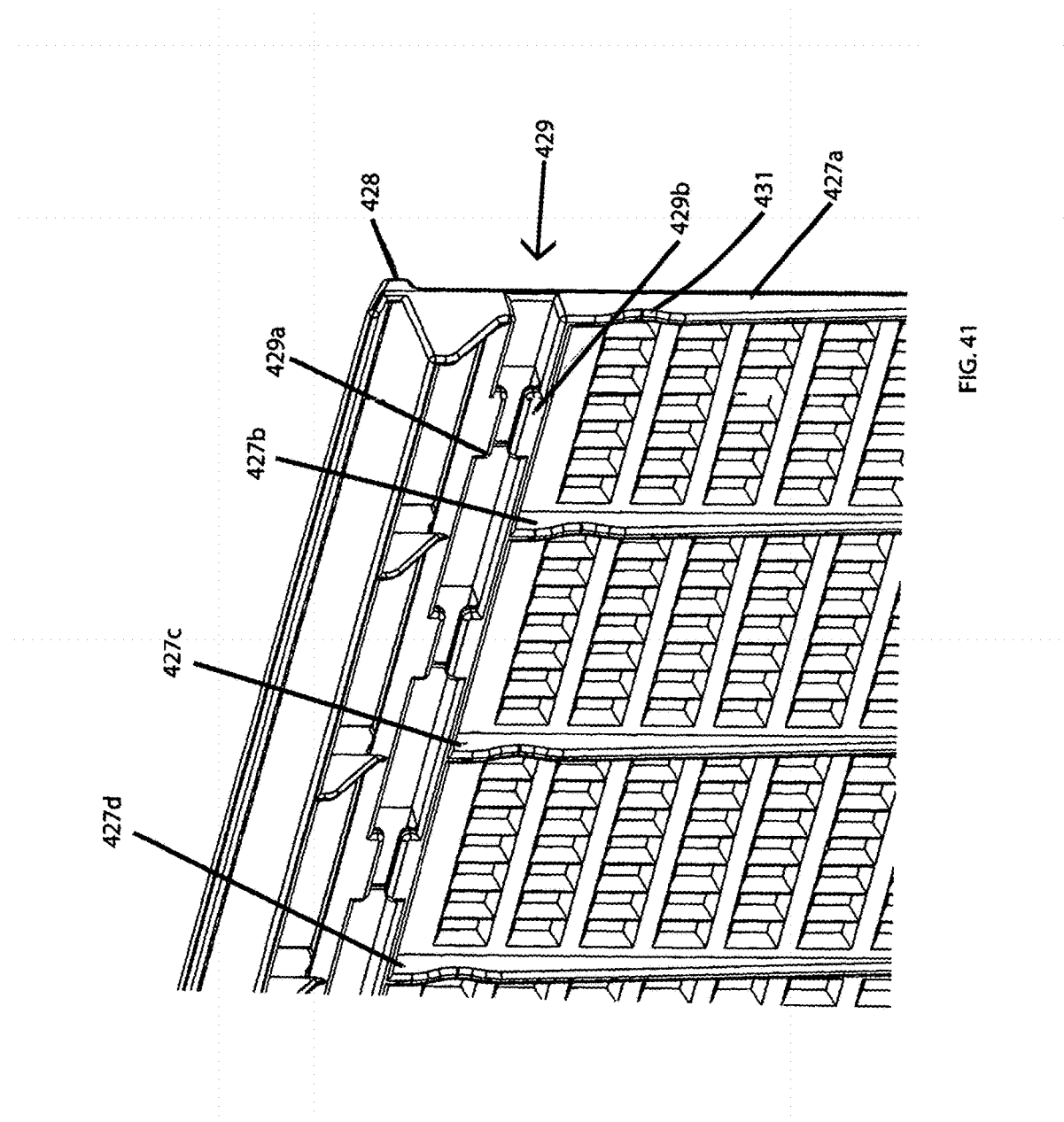
FIG. 41 is an exploded view of a rear side of a collection assembly of the debris collector shown in FIG. 36.
Figure 42:
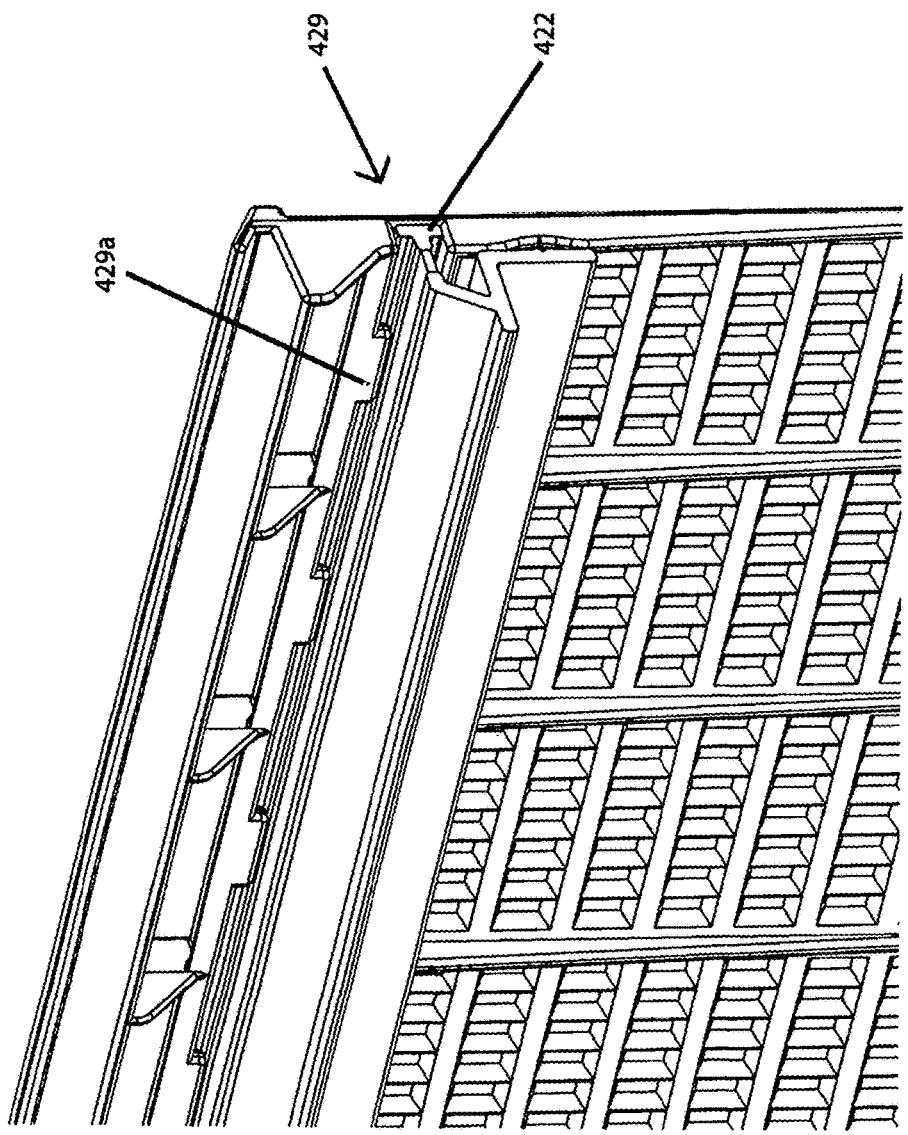
FIG. 42 is an exploded view of a rear side of a collection assembly and a mounting assembly of the debris collector shown in FIG. 36.

The reinforcement structure 427 of the debris collector 402 can include reinforcement strips 427a-d, as shown in FIGS. 40-41. The reinforcement strips 427a-d provide support for the screen section 424 as the screen section 424 is capable of receiving large and/or heavy amounts of debris from the roof. The reinforcement strips 427a-d can also include indents 431 for providing spacing for screw location ribs 436, described below.

The mounting assembly 413 of the debris collector 402 can include a gutter mounting section 430 and a hinge mounting section 432. The gutter mounting section 430 can be an L-shaped mount for attaching to a gutter rail of roof gutter 405. The gutter mounting section 430 can securely retain the debris collector 402 to the roof gutter system 405. e.g., with screws positioned in screw location ribs 436, but other attachment mechanisms are contemplated, e.g., snap-on components. The hinge mounting section 432 can project from the gutter mounting section 430 at one end and can be fixedly attached to the hinge 420 at the other end.

The hinge 420 can include a hinge section 421 and a tee section 422. The hinge section 421 can be constructed from a flexible material, e.g., a thermoplastic elastomer/rubber while the tee section 422 can be constructed from a solid material e.g., polymers, thermoplastics, thermosets and/or elastomers.

In some implementations, the gutter mounting section 430, the hinge mounting section 432, the hinge section 421 and the tee section 422 can be integrally connected to one another through a co-extrusion process. For example, the gutter mounting section 430, the hinge mounting section 432, and the tee section 422 can be constructed from a solid material e.g., polymers, thermoplastics, thermosets, elastomers while the hinge section 421 can be constructed from a flexible material, e.g., a thermoplastic elastomer/rubber. Other manufacturing processes are contemplated.

To assemble the debris collector 402, the tee section 422 of the hinge 420 can be slidably received by the tee receiver guide 429. Once in place, the debris collector 402 can be screwably mounted to the gutter 404. In some implementations, the collection assembly 411 can be removed and replaced as needed.

Figure 51:
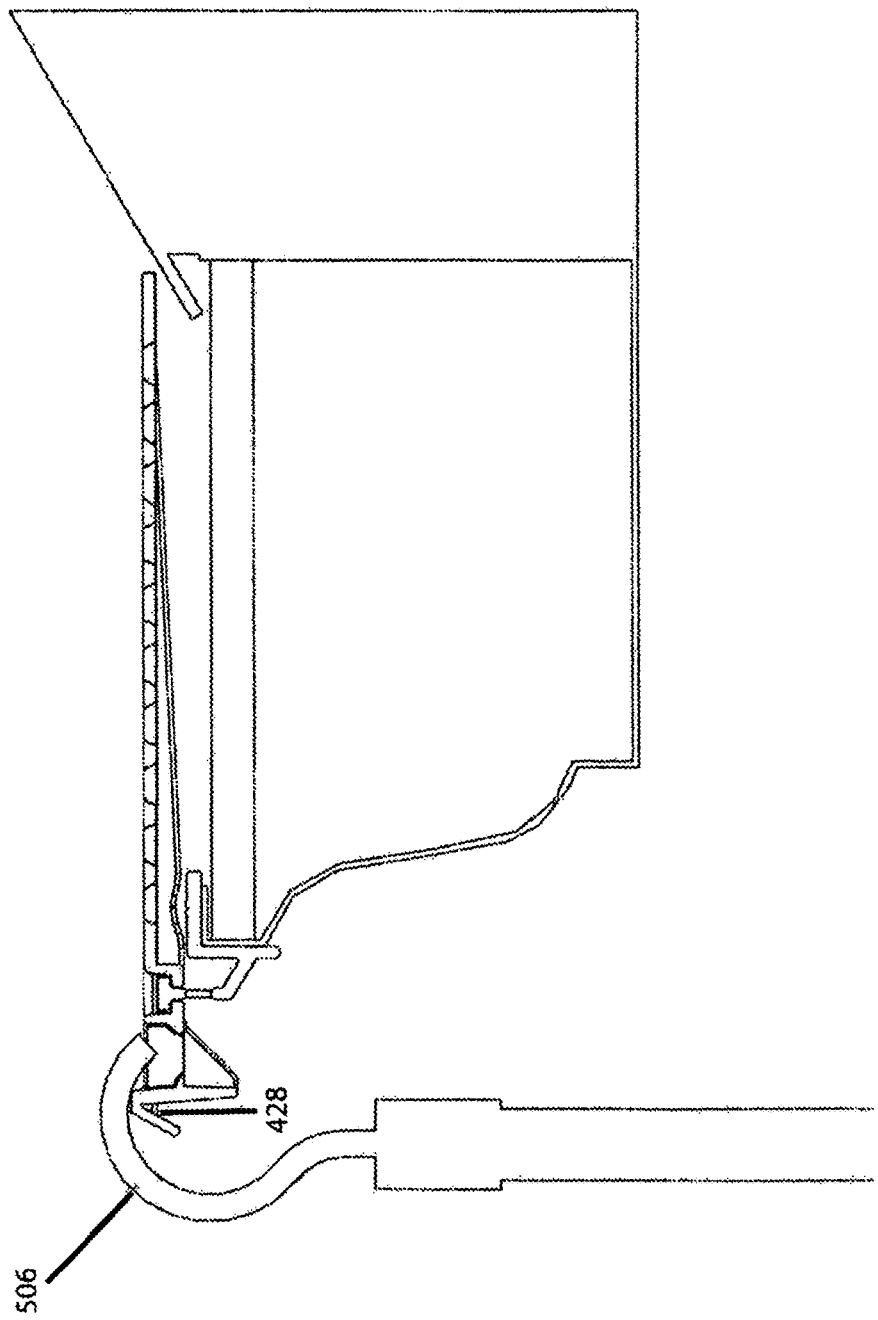
FIG. 51 is a cross-sectional view of a debris collector in a first position with a poling tool.
Figure 52:
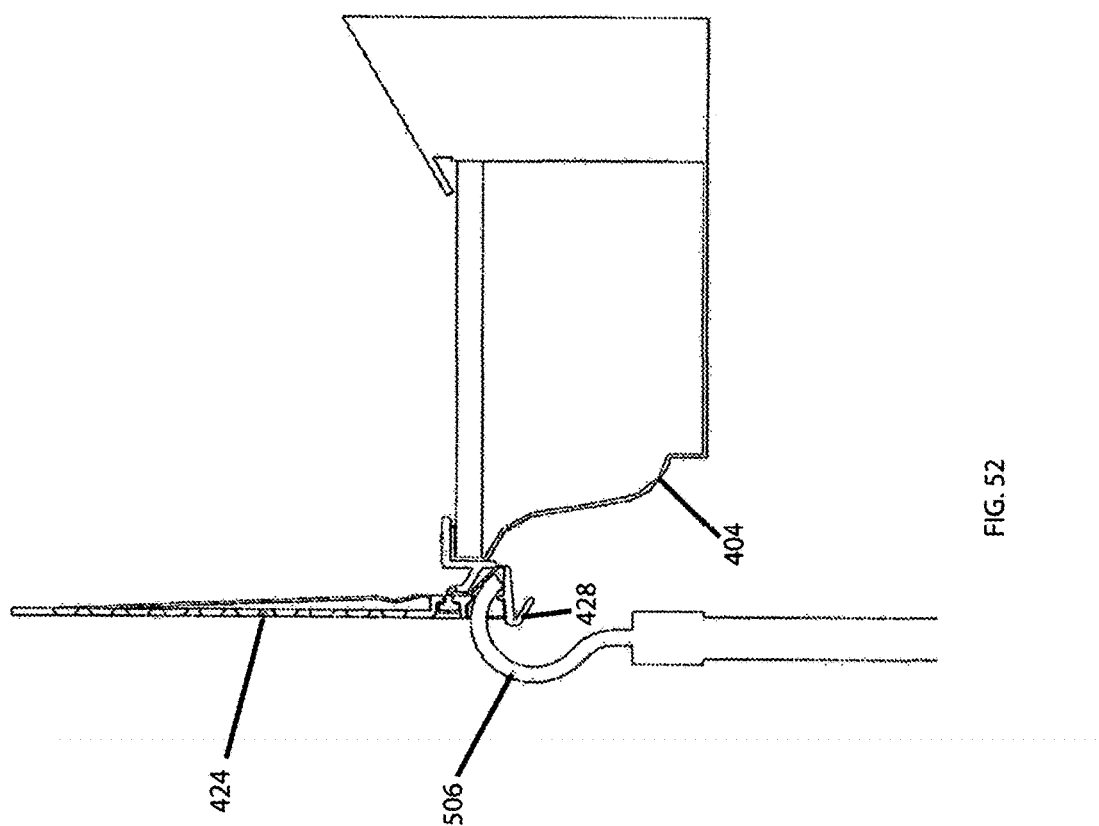
FIG. 52 is a cross-sectional view of the debris collector shown in FIG. 51 in a second position with a poling tool.

In some implementations, as shown in FIGS. 49-53, a poling tool 500 can be used to rotate a debris collector 402 from the gutter 404. The poling tool can include a handle 502, a hook 506 and a connector 504. In use, the hook 506 is positioned to inside portion of the grab rail 428. A user then can pull down on the poling tool 500 thereby moving the debris collector 402 from a first position to a second position. In some implementations, as shown in FIGS. 51-53, the grab rail 428 can include a catch 450 for establishing a grab point for the poling tool 500.

While presently preferred embodiments have been described for purposes of the disclosure, numerous changes in the arrangement can be made by those skilled in the art. Such changes are encompassed within the spirit of the invention as defined by the appended claims.

The foregoing Detailed Description is to be understood as being in every respect illustrative and exemplary, but not restrictive, and the scope of the disclosed technology disclosed herein is not to be determined from the Detailed Description, but rather from the claims as interpreted according to the full breadth permitted by the patent laws. It is to be understood that the embodiments shown and described herein are only illustrative of the principles of the disclosed technology and that various modifications may be implemented by those skilled in the art without departing from the scope and spirit of the disclosed technology. Those skilled in the art could implement various other feature combinations without departing from the scope and spirit of the disclosed technology. Although the embodiments of the present disclosure have been described with specific examples, it is to be understood that the disclosure is not limited to those specific examples and that various other changes, combinations and modifications will be apparent to one of ordinary skill in the art without departing from the scope and spirit of the disclosed technology which is to be determined with reference to the following claims.

The invention claimed is:

1. An apparatus for catching debris comprising:
a collection assembly, the collection assembly including a screen section and a grab rail, the collection assembly configured to move between a first position and a second position; and
a mounting assembly configured to attach to a gutter, the mounting assembly including a hinge defined by a tee section and a hinge section, the hinge pivotally connecting the mounting assembly to the collection assembly,
wherein the collection assembly includes a tee receiver guide configured to slidably receive the tee section of the hinge,
wherein, when the grab rail is actuated, the collection assembly is moved between the first position and the second position.

2. The apparatus of claim 1 wherein the mounting assembly is fixedly attached to the gutter.

3. The apparatus of claim 1 wherein the tee receiver guide includes fingers.

4. The apparatus of claim 1 wherein the screen section is laid out in a grid pattern.

5. The apparatus of claim 1 wherein the collection assembly includes reinforcing strips.

6. The apparatus of claim 5 wherein the reinforcing strips include indents providing spacing for screw position ribs.

7. The apparatus of claim 1 wherein the hinge section is made from a flexible material.

8. The apparatus of claim 7 wherein the tee section and the mounting assembly are formed from a solid material.

9. The apparatus of claim 8 wherein the tee section, the hinge section and the mounting assembly are formed as a single unit during a co-extrusion process.

10. The apparatus of claim 9 wherein the grab rail includes a catch.

* * * * *